US011235306B2

(12) United States Patent
Al Hamouz et al.

(10) Patent No.: US 11,235,306 B2
(45) Date of Patent: Feb. 1, 2022

(54) PHENOTHIAZINE BASED CROSSLINKED POLYMER AND METHODS THEREOF

(71) Applicant: KING FAHD UNIVERSITY OF PETROLEUM AND MINERALS, Dhahran (SA)

(72) Inventors: Othman Charles Sadeq Al Hamouz, Dhahran (SA); Mahmoud Mohamed Abdelnaby, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 435 days.

(21) Appl. No.: 16/400,433

(22) Filed: May 1, 2019

(65) Prior Publication Data

US 2020/0346185 A1    Nov. 5, 2020

(51) Int. Cl.
*B01J 20/26* (2006.01)
*C08G 16/02* (2006.01)
*B01J 20/28* (2006.01)
*B01J 20/30* (2006.01)
*B01J 20/34* (2006.01)
*B01D 53/02* (2006.01)

(52) U.S. Cl.
CPC ............ *B01J 20/264* (2013.01); *B01D 53/02* (2013.01); *B01J 20/2808* (2013.01); *B01J 20/28061* (2013.01); *B01J 20/28064* (2013.01); *B01J 20/3085* (2013.01); *B01J 20/3425* (2013.01); *B01J 20/3458* (2013.01); *C08G 16/0275* (2013.01); *B01D 2253/202* (2013.01); *B01D 2256/10* (2013.01); *B01D 2257/504* (2013.01); *B01D 2259/40086* (2013.01)

(58) Field of Classification Search
CPC .... B01J 20/26; B01J 20/264; B01J 20/28061; B01J 20/28064; B01J 20/2808; B01J 20/3085; B01J 20/3425; B01J 20/3458; B01D 53/02; B01D 2253/202; B01D 2256/10; B01D 2257/504; B01D 2259/40086; C08G 16/0275

USPC .......................................................... 423/228
See application file for complete search history.

(56) References Cited

U.S. PATENT DOCUMENTS

| 4,960,885 A | 10/1990 | DeWald et al. |
| 5,705,394 A | 1/1998 | Ananthasubramanian et al. |
| 2003/0131731 A1 | 7/2003 | Koros et al. |

FOREIGN PATENT DOCUMENTS

| EP | 0 856 539 A1 | 8/1998 |
| WO | WO 2013/014420 A1 | 1/2013 |
| WO | WO 2016/147116 A1 | 9/2016 |
| WO | WO 2016/167725 A1 | 10/2016 |
| WO | WO 2017/021843 A1 | 2/2017 |

OTHER PUBLICATIONS

Qiang Fu, et al., "A novel cross-linked nano-coatirig for carbon dioxide capture", Energy & Environmental Science, Nov. 10, 2015, pp. 434-440.
Zhi Qiao, et al., "Synthesis and electroluminescence properties of fluorene-co-diketopyrrolopyrrole-co-phenothiazine polymers", POLYMER, vol. 51, Issue 5, Mar. 2, 2010, pp. 1016-1023 (Abstract only).
Mahmoud M. Abdelnaby, et al., "Carbon dioxide capture in the presence of water by an amine-based crosslinked porous polymer", Journal of Materials Chemistry A, vol. 6, No. 15, Mar. 26, 2018, pp. 6455-6462.
Sushma Prajapati, et al., "Friedel-Craft Reaction: A Review", International Journal of Pharmaceutical, Chemical and Biological Sciences, vol. 2, No. 1, 2012, pp. 52-62.

*Primary Examiner* — Edward M Johnson
(74) *Attorney, Agent, or Firm* — Oblon, McClelland, Maier & Neustadt, L.L.P.

(57) ABSTRACT

Crosslinked polymers made up of polymerized units of phenothiazine, pyrrole, and aldehyde. The crosslinked polymers are porous with a BET surface area in the range of 300-600 $m^2/g$. A method of synthesizing the crosslinked polymers is described. Processes for using the crosslinked polymers as adsorbent materials for adsorbing gases (e.g. $CO_2$ capturing), and separating fluid mixtures under dry and wet conditions are also introduced.

20 Claims, 12 Drawing Sheets

PHENOTHIAZINE BASED CROSSLINKED POLYMER AND METHODS THEREOF

STATEMENT OF FUNDING ACKNOWLEDGEMENT

This project was supported by King Fahd University of Petroleum and Minerals (KFUPM) under project number IN161034.

BACKGROUND OF THE INVENTION

Technical Field

The present disclosure relates to crosslinked polymers produced from polycondensation reactions of a phenothiazine, an aldehyde, and a pyrrole compound, methods of making the crosslinked polymers, and a method of selective gas adsorption (e.g. $CO_2$ capturing) and separation using the crosslinked polymers.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The urgent need to control global $CO_2$ emissions from various fossil-fuel based industries requires a practical solution. Carbon capture and sequestration (CCS) is considered one of the most powerful techniques to manage $CO_2$ levels. Generally, two main processes, namely pre-combustion of $CO_2$ from fuel gas and post-combustion of flue gas, are involved in CCS to reduce $CO_2$ emissions into the atmosphere. Gas streams for $CO_2$ capturing via post-combustion processes often contain a mixture of $N_2$ (70-75 vol %), $CO_2$ (15-16 vol %), and $H_2O$ (5-7 vol %) with a total pressure of about 1 bar [Sumida, K.; Rogow, D. L.; Mason, J. A.; McDonald, T. M.; Bloch, E. D.; Herm, Z. R.; Bae, T.-H.; Long, J. R. Carbon Dioxide Capture in Metal-Organic Frameworks. Chem. Rev. 2012, 112 (2), 724-781]. To practically capture $CO_2$ under these conditions the sorbent material must be effective in the presence of water and more selective for $CO_2$ than $N_2$ or $H_2O$. CCS using solid sorbents with low regeneration energy [Drage, T. C.; Smith, K. M.; Pevida, C.; Arenillas, A.; Snape, C. E. Development of Adsorbent Technologies for Post-Combustion $CO_2$ Capture. Energy Procedia 2009, 1 (1), 881-884] and minimal environmental impact is considered superior to CCS using aqueous amine solutions [Peeters, A. N. M.; Faaij, A. P. C.; Turkenburg, W. C. Techno-Economic Analysis of Natural Gas Combined Cycles with Post-Combustion CO2 Absorption, Including a Detailed Evaluation of the Development Potential. Int. J. Greenh. Gas Control 2007, 1 (4), 396-417; Rochelle, G. T. Amine Scrubbing for CO2 Capture. Science 2009, 325 (5948), 1652-1654; Sue, A. C.-H.; Mannige, R. V; Deng, H.; Cao, D.; Wang, C.; Gándara, F.; Stoddart, J. F.; Whitelam, S.; Yaghi, O. M. Heterogeneity of Functional Groups in a Metal-Organic Framework Displays Magic Number Ratios. Proc. Natl. Acad. Sci. U S. A. 2015, 112 (18), 5591-5596; Wang, J.; Huang, L.; Yang, R.; Zhang, Z.; Wu, J.; Gao, Y.; Wang, Q.; O'Hare, D.; Zhong, Z. Recent Advances in Solid Sorbents for $CO_2$ Capture and New Development Trends. Energy Environ. Sci. 2014, 7 (11), 3478-3518; and Lu, A.-H.; Hao, G.-P. Porous Materials for Carbon Dioxide Capture. Annu. Reports Sect. "A" (Inorganic Chem. 2013, 109, 484].

Porous organic polymers (POPs) [Dawson, R.; Stockel, E.; Holst, J. R.; Adams, D. J.; Cooper, A. I. Microporous Organic Polymers for Carbon Dioxide Capture. Energy Environ. Sci. 2011, 4 (10), 4239; Dawson, R.; Adams, D. J.; Cooper, A. I. Chemical Tuning of $CO_2$ Sorption in Robust Nanoporous Organic Polymers. Chem. Sci. 2011, 2 (6), 1173; and Gao, H.; Ding, L.; Li, W.; Ma, G.; Bai, H.; Li, L. Hyper-Cross-Linked Organic Microporous Polymers Based on Alternating Copolymerization of Bismaleimide. ACS Macro Lett. 2016, 5 (3), 377-381, each incorporated herein by reference in their entirety] have become prominent candidates in recent years for use as solid adsorbents due to their efficient and selective capture of $CO_2$, chemical stability, and structural diversity with multifunctional active groups [Klumpen, C.; Breunig, M.; Homburg, T.; Stock, N.; Senker, J. Microporous Organic Polyimides for $CO_2$ and $H_2O$ Capture and Separation from $CH_4$ and $N_2$ Mixtures: Interplay between Porosity and Chemical Function. Chem. Mater. 2016, 28 (15), 5461-5470; Liu, G.; Wang, Y.; Shen, C.; Ju, Z.; Yuan, D.; Yavuz, C. T.; Coskun, A.; Hagaman, E. W.; Bian, Z.; Zhou, J. H.; Hu, J.; Liu, H.; Dai, S. A Facile Synthesis of Microporous Organic Polymers for Efficient Gas Storage and Separation. J. Mater. Chem. A 2015, 3 (6), 3051-3058; and Dawson, R.; Stöckel, E.; Host, J. R.; Adams, D. J.; Cooper, A. I.; Pis, J. J.; Rubiera, F.; Pevida, C.; Cooper, A. I.; Schiffman, F.; Cora, F.; Slater, B.; Steiner, A.; Day, G. M.; Cooper, A. I.; Slawin, A. M. Z.; Steiner, A.; Cooper, A. I. Microporous Organic Polymers for Carbon Dioxide Capture. Energy Environ. Sci. 2011, 4 (10), 4239, each incorporated herein by reference in their entirety]. A wide range of porous organic networks have been explored in recent years, including covalent organic frameworks (COFs) [Xu, H.; Gao, J.; Jiang, D. Stable, Crystalline, Porous, Covalent Organic Frameworks as a Platform for Chiral Organocatalysts. Nat. Chem. 2015, 7 (11), 905-912; Furukawa, H.; Yaghi, O. M. Storage of Hydrogen, Methane, and Carbon Dioxide in Highly Porous Covalent Organic Frameworks for Clean Energy Applications. J. Am. Chem. Soc. 2009, 131 (25), 8875-8883; and Zeng, Y.; Zou, R.; Zhao, Y. Covalent Organic Frameworks for $CO_2$ Capture. Adv. Mater. 2016, 28 (15), 2855-2873, each incorporated herein by reference in their entirety], crystalline triazine frameworks (CTFs) [Dey, S.; Bhunia, A.; Esquivel, D.; Janiak, C.; Mastalerz, M.; Xia, H.; Mu, Y.; Xiong, X.; Pan, C.; Li, S.; Qiu, S.; Zhu, G. Covalent Triazine-Based Frameworks (CTFs) from Triptycene and Fluorene Motifs for $CO_2$ Adsorption. J. Mater. Chem. A 2016, 4 (17), 6259-6263; and Hug, S.; Stegbauer, L.; Oh, H.; Hirscher, M.; Lotsch, B. V. Nitrogen-Rich Covalent Triazine Frameworks as High-Performance Platforms for Selective Carbon Capture and Storage. Chem. Mater. 2015, 27 (23), 8001-8010, each incorporated herein by reference in their entirety], porous aromatic frameworks (PAFs) [Diaz, U.; Corma, A. Ordered Covalent Organic Frameworks, COFs and PAFs. From Preparation to Application. Coord. Chem. Rev. 2016, 311, 85-124, incorporated herein by reference in its entirety], hypercross-linked polymers (HCPs) [Luo, Y.; Li, B.; Wang, W.; Wu, K.; Tan, B. Hypercrosslinked Aromatic Heterocyclic Microporous Polymers: A New Class of Highly Selective $CO_2$ Capturing Materials. Adv. Mater. 2012, 24 (42), 5703-5707; Hu, L.; Ni, H.; Chen, X.; Wang, L.; Wei, Y.; Jiang, T.; L, Y.; Lu, X.; Ye, P. Hypercrosslinked Polymers Incorporated with Imidazolium Salts for Enhancing $CO_2$ Capture. Polym. Eng. Sci. 2016, 56, 573-582; and Tan, L.; Tan, B.; Fei, T.; Zhang, T.;

Ghasimi, S.; Lu, H.; Landfester, K.; Zhang, K. A. I.; Liu, H.; Ouyang, G.; Hu, J.; Liu, H.; Dai, S.; Snape, C. E.; Drage, T. C.; Cooper, A. I.; Steiner, A.; Cooper, A. I. Hypercrosslinked Porous Polymer Materials: Design, Synthesis, and Applications. *Chem. Soc. Rev.* 2017, 203, 752-758, each incorporated herein by reference in their entirety], and conjugated microporous polymers (CMPs) [Dawson, R.; Adams, D. J.; Cooper, A. I. Chemical Tuning of $CO_2$ Sorption in Robust Nanoporous Organic Polymers. *Chem. Sci.* 2011, 2 (6), 1173, incorporated herein by reference in its entirety]. Simulation studies have shown that incorporating phenyl rings and polar functionalities into porous networks might enhance the binding affinity to acid $CO_2$ gas [Chang, Z.; Zhang, D.-S.; Chen, Q.; Bu, X.-H. Microporous Organic Polymers for Gas Storage and Separation Applications. *Phys. Chem. Chem. Phys.* 2013, 15 (15), 5430]. Many other strategies such as improving surface area and tuning pore size have been explored to enhance the $CO_2$ uptake of porous organic polymers [Liu, G.; Wang, Y.; Shen, C.; Ju, Z.; Yuan, D.; Yavuz, C. T.; Coskun, A.; Hagaman, E. W.; Bian, Z.; Zhou, J. H.; Hu, J.; Liu, H.; Dai, S. A Facile Synthesis of Microporous Organic Polymers for Efficient Gas Storage and Separation. *J. Mater. Chem. A* 2015, 3 (6), 3051-3058; Dawson, R.; Stöckel, E.; Holst, J. R.; Adams, D. J.; Cooper, A. I.; Pis, J. J.; Rubiera, F.; Pevida, C.; Cooper, A. I.; Schiffman, F.; Cora, F.; Slater, B.; Steiner, A.; Day, G. M.; Cooper, A. I.; Slawin, A. M. Z.; Steiner, A.; Cooper, A. I. Microporous Organic Polymers for Carbon Dioxide Capture. *Energy Environ. Sci.* 2011, 4 (10), 4239; Xu, H.; Gao, J.; Jiang, D. Stable, Crystalline, Porous, Covalent Organic Frameworks as a Platform for Chiral Organocatalysts. *Nat. Chem.* 2015, 7(11), 905-912; and Diaz, U.; Corma, A. Ordered Covalent Organic Frameworks, COFs and PAFs. From Preparation to Application. *Coord. Chem. Rev.* 2016, 311, 85-124, each incorporated herein by reference in their entirety]. Despite these efforts there is still a need to develop more efficient adsorbent materials for $CO_2$ capturing.

In view of the forgoing, one objective of the present disclosure is to provide porous crosslinked polymers and polymer compositions prepared from a polycondensation reaction of a phenothiazine monomer, a pyrrole monomer, and an aldehyde. Further objectives of the present disclosure are to provide a method of making the crosslinked polymers and a method for using them as gas separation and storage materials.

BRIEF SUMMARY OF THE INVENTION

According to a first aspect, the present disclosure relates to a crosslinked polymer, comprising reacted units of a phenothiazine monomer of formula (I)

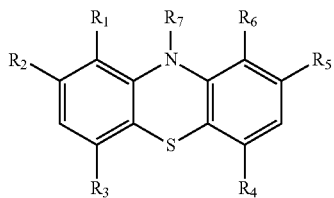

(I)

or a salt thereof, a solvate thereof, a tautomer thereof, a stereoisomer thereof, or a mixture thereof, a pyrrole monomer of formula (II)

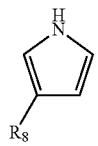

(II)

or a salt thereof, a solvate thereof, a tautomer thereof, a stereoisomer thereof, or a mixture thereof, and an aldehyde of formula (III)

(III)

or a salt thereof, a solvate thereof, a stereoisomer thereof, or a mixture thereof wherein (i) $R_1$, $R_2$, $R_3$, $R_4$, $R_5$, and $R_6$ are independently selected from the group consisting of a hydrogen, an optionally substituted alkyl, an optionally substituted cycloalkyl, an optionally substituted arylalkyl, an optionally substituted aryl, an optionally substituted alkoxy, and an optionally substituted alkylthio, (ii) $R_7$ is selected from the group consisting of a hydrogen, an optionally substituted alkyl, an optionally substituted cycloalkyl, and an optionally substituted arylalkyl, (iii) $R_8$ is selected from the group consisting of a hydrogen, an optionally substituted alkyl, an optionally substituted cycloalkyl, an optionally substituted arylalkyl, and an optionally substituted aryl, and (iv) $R_9$ is selected from the group consisting of a hydrogen, an optionally substituted alkyl, an optionally substituted cycloalkyl, an optionally substituted arylalkyl, and an optionally substituted aryl.

In one embodiment, $R_7$ is a hydrogen.

In one embodiment, the phenothiazine monomer of formula (I) is

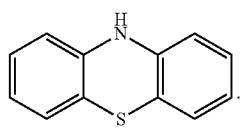

In one embodiment, the pyrrole monomer of formula (II) is

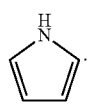

In one embodiment, the aldehyde of formula (III) is formaldehyde.

In one embodiment, a molar ratio of the pyrrole monomer of formula (II) to the phenothiazine monomer of formula (I) is in a range of 1:1 to 6:1.

In one embodiment, a molar ratio of the aldehyde of formula (III) to the phenothiazine monomer of formula (I) is in a range of 3:1 to 12:1.

In one embodiment, a molar ratio of the pyrrole monomer of formula (II) to the phenothiazine monomer of formula (I) is in a range of 2.5:1 to 3.5:1, and a molar ratio of the aldehyde of formula (III) to the phenothiazine monomer of formula (I) is in a range of 5:1 to 7:1.

In one embodiment, the crosslinked polymer has a BET surface area in the range of 300-600 m$^2$/g.

In one embodiment, the crosslinked polymer is porous with an average pore width of 0.8-2 nm.

In one embodiment, the crosslinked polymer has a $CO_2$ uptake capacity in a range of 15-45 cm/g at a temperature of 0-40° C. and a pressure of 400-800 Torr.

In one embodiment, the crosslinked polymer has an ideal selectivity of $CO_2$ over $N_2$ in a range of 10-60.

According to a second aspect, the present disclosure relates to a method of making the crosslinked polymer of the first aspect. The method involves the steps of (i) mixing the phenothiazine monomer of formula (I) and the aldehyde of formula (III) in a solution comprising a solvent to form a first mixture, (ii) mixing the pyrrole monomer of formula (II) and an acid with the first mixture to form a second mixture, and (iii) heating the second mixture thereby forming the crosslinked polymer.

In one embodiment, the acid is ferric chloride.

In one embodiment, the solvent comprises dimethylformamide.

In one embodiment, the second mixture is heated at a temperature of 70-150° C.

According to a third aspect, the present disclosure relates to a method of separating a first gas from a fluid mixture comprising the first gas and a second gas. The method involves the steps of (i) contacting the fluid mixture with the crosslinked polymer of the first aspect, and (ii) adsorbing the first gas onto the crosslinked polymer, thereby separating the first gas from the fluid mixture and forming a first gas loaded crosslinked polymer.

In one embodiment, the first gas is $CO_2$, and the second gas is $N_2$.

In one embodiment, the fluid mixture further comprises $H_2O$.

In one embodiment, the method further comprises the steps of desorbing the first gas from the first gas loaded crosslinked polymer by flowing $N_2$ gas over the first gas loaded crosslinked polymer to regenerate the crosslinked polymer, and reusing the crosslinked polymer.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
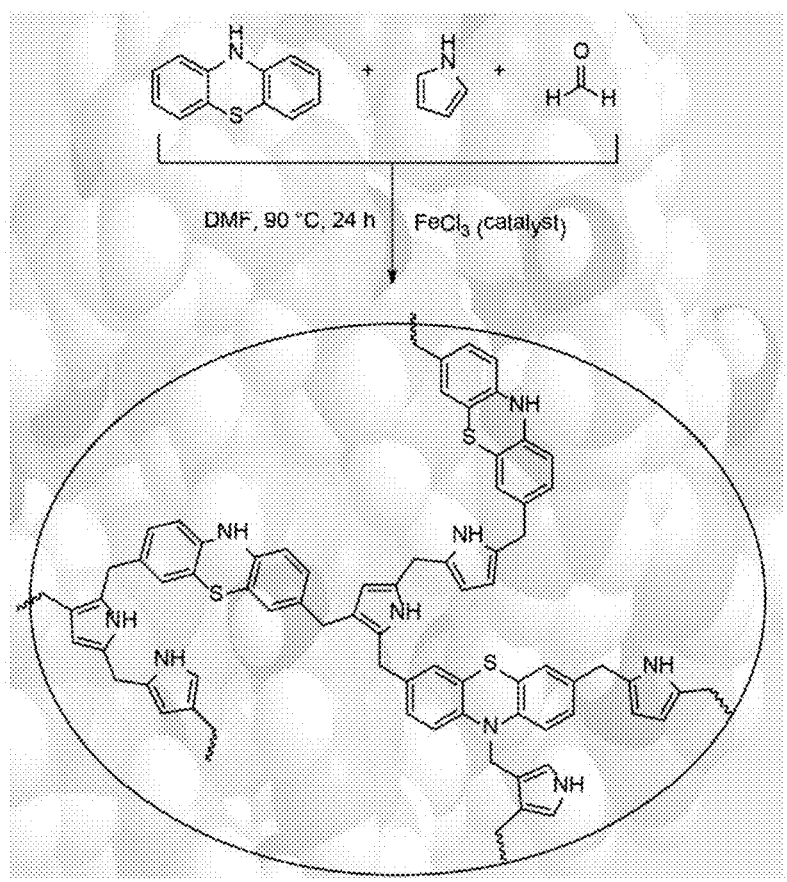
FIG. 1 is an illustration showing a synthesis scheme of the crosslinked polymer KFUPM-2.
Figure 2:
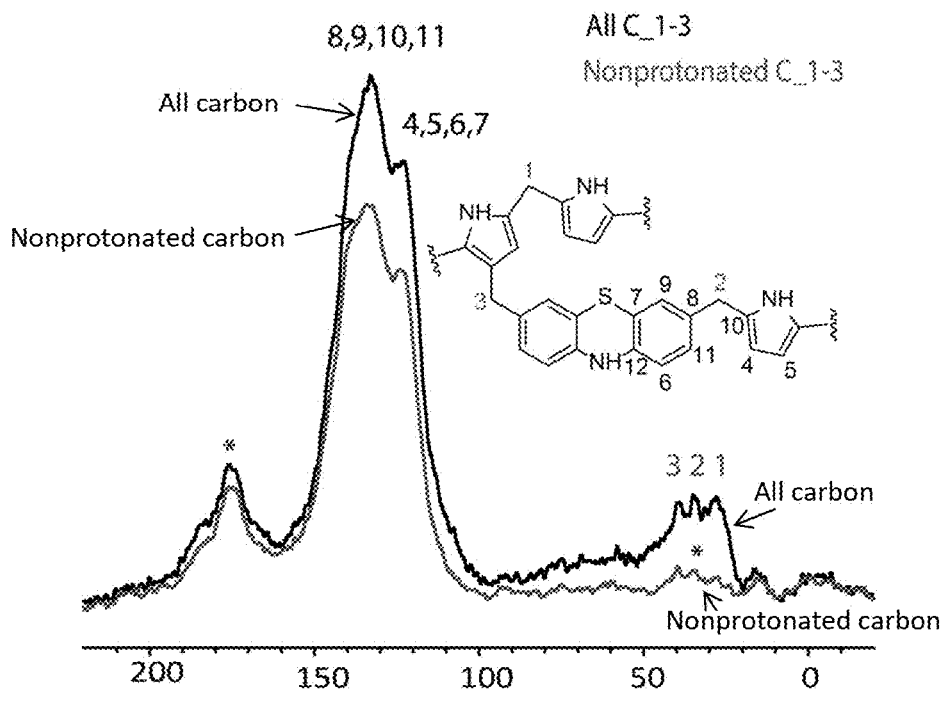
FIG. 2 is an overlay of solid-state $^{13}C$ nuclear magnetic resonance (NMR) spectra showing all carbons and non-protonated carbons (i.e. carbons without hydrogen bonded), respectively, of the crosslinked polymer KFUPM-2.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "compound" and "monomer" are used interchangeably, and are intended to refer to a chemical entity, whether in the solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, iso-propanol, n-butanol, iso-butanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those of ordinary skill in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the ring systems, stereogenic centers, and the like can all be present in the compounds, and all such stable isomers are contemplated in the present disclosure. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{12}C$, $^{13}C$, and $^{14}C$, isotopes of nitrogen include $^{14}N$ and $^{15}N$, and isotopes of sulfur include $^{32}S$, $^{33}S$, $^{34}S$, and $^{36}S$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyridyl, pyrimidiyl, and the like), substituted heterocyclyl and mixtures thereof and the like. The substituents may themselves be optionally substituted, and may be either unprotected, or protected as necessary, as known to those of ordinary skill in the art, for example, as taught in Greene, et al., "Protective Groups in Organic Synthesis", John Wiley and Sons, Second Edition, 1991, hereby incorporated by reference in its entirety.

As used herein, the term "alkyl" unless otherwise specified refers to both branched and straight chain saturated aliphatic primary, secondary, and/or tertiary hydrocarbons of typically $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

As used herein, the term "aryl" unless otherwise specified refers to functional groups or substituents derived from an aromatic ring including, but not limited to, phenyl, biphenyl, napthyl, anthracenyl, thienyl, and indolyl. As used herein, the term optionally includes both substituted and unsubstituted moieties. Exemplary moieties with which the aryl group can be substituted may be selected from the group including, but not limited to, hydroxy, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

The term "alkylthio" as used herein refers to a divalent sulfur with alkyl occupying one of the valencies and includes the groups such as methylthio, ethylthio, propylthio, butylthio, pentylthio, hexylthio, and octylthio.

According to a first aspect, the present disclosure relates to a crosslinked polymer, comprising reacted units of a phenothiazine monomer of formula (I)

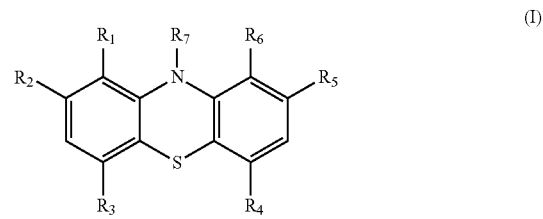

or a salt thereof, a solvate thereof, a tautomer thereof, a stereoisomer thereof, or a mixture thereof, a pyrrole monomer of formula (II)

or a salt thereof, a solvate thereof, a tautomer thereof, a stereoisomer thereof, or a mixture thereof, and an aldehyde of formula (III)

or a salt thereof, a solvate thereof, a stereoisomer thereof, or a mixture thereof.

$R_1$, $R_2$, $R_3$, $R_4$, $R_5$, and $R_6$ are independently selected from the group consisting of a hydrogen, an optionally substituted alkyl, an optionally substituted cycloalkyl, an optionally substituted arylalkyl, an optionally substituted aryl, an optionally substituted alkoxy, and an optionally substituted alkylthio. $R_7$ is selected from the group consisting of a hydrogen, an optionally substituted alkyl, an optionally substituted cycloalkyl, and an optionally substituted arylalkyl. Exemplary phenothiazine monomers include, but are not limited to, 10H-phenothiazine, 2-methylphenothiazine, 10-methylphenothiazine, 2-methoxyphenothiazine, 2-methylthiophenothiazine, promazine, promethazine, and thioridazine. In one preferred embodiment, $R_7$ is a hydrogen. In another preferred embodiment, each $R_1$, $R_2$, $R_3$, $R_4$, $R_5$, and $R_6$ is independently a hydrogen. In a most preferred embodiment, the phenothiazine monomer of formula (I) is

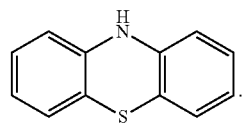

R₈ is selected from the group consisting of a hydrogen, an optionally substituted alkyl, an optionally substituted cycloalkyl, an optionally substituted arylalkyl, and an optionally substituted aryl. In a preferred embodiment, R₈ is a hydrogen or an optionally substituted alkyl. Most preferably, R₈ is a hydrogen and the pyrrole monomer of formula (II) is

R₉ is selected from the group consisting of a hydrogen, an optionally substituted alkyl, an optionally substituted cycloalkyl, an optionally substituted arylalkyl, and an optionally substituted aryl. Exemplary aldehydes include, but are not limited to, formaldehyde, acetaldehyde, propionaldehyde, butyraldehyde, isobutyraldehyde, and mixtures thereof. In a preferred embodiment, R₁₀ is a hydrogen and the aldehyde of formula (III) is formaldehyde. The formaldehyde may be in any form, e.g. formalin, 1,3,5-trioxane, or paraformaldehyde. Preferably the formaldehyde is present as paraformaldehyde.

As used herein, monomers are molecules which can undergo polymerization, thereby contributing constitutional repeating units to the structures of a macromolecule or polymer. The process by which monomers combine end to end to form a polymer is referred to herein as "polymerization". As used herein, a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc.

Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively. Statistical copolymers are copolymers in which the sequence of monomer residues follows a statistical rule. That is, the probability of finding a particular monomer residue at a particular point in the chain is equal to the mole fraction of that monomer residue in the chain. The statistical copolymer may be referred to as a truly random copolymer. The crosslinked polymer of the present disclosure may be a block copolymer (e.g. a block terpolymer) or a random copolymer (e.g. a random terpolymer).

As used herein, "crosslinking", "cross-linking", "crosslinked", "cross-linked", a "crosslink", or a "cross-link" refers to polymers and resins containing branches that connect polymer chains via bonds that link one polymer chain to another. The crosslink may be an atom, a group of atoms, or a number of branch points connected by bonds, groups of atoms, or polymer chains. A crosslink may be formed by chemical reactions that are initiated by heat, pressure, radiation, change in pH, etc with the presence of at least one crosslinking monomer having more than two extension points, which is a monomer having more than two reactive sites. In one or more embodiments, the pyrrole monomer of formula (II) having three reactive sites (2-, 3-, and 5-positions of pyrrole ring) functions as a crosslinking monomer, where each reactive position can act as an extension point and form a crosslink. In certain embodiments, wherein R₇ is a hydrogen, the phenothiazine monomer of formula (I) having three reactive sites (3- and 7-positions and nitrogen group of phenothiazine) participates as a crosslinking monomer, where each reactive site can act as an extension point and form a crosslink (see FIG. 1).

A "polycondensation" refers to a form of step growth polymerization where monomers join together by losing small molecules such as water or methanol, preferably water, as byproducts. This is in contrast to addition polymerizations which often involve reactions of unsaturated molecules. In one or more embodiment, the crosslinked polymer disclosed herein is a polycondensation product of a three-component reaction of a phenothiazine monomer of formula (I), a pyrrole monomer of formula (II), and an aldehyde of formula (III).

In a preferred embodiment, the crosslinked polymer is a polycondensation product of a three-component reaction of 10H-phenothiazine, 1H-pyrrole, and formaldehyde. In an alternative embodiment, the crosslinked polymer is a polycondensation product of a reaction of 1H-pyrrole, formaldehyde, as well as two or more compounds of the phenothiazine monomer of formula (I), such as a mixture of at least two selected from 10H-phenothiazine, 2-methylphenothiazine, 2-methoxyphenothiazine, 2-methylthiophenothiazine, and 10-methylphenothiazine. In another embodiment, the crosslinked polymer is a polycondensation product of a reaction of 10H-phenothiazine, 1H-pyrrole, as well as two or more compounds of the aldehyde of formula (III), such as a mixture of at least two selected from formaldehyde, acetaldehyde, propionaldehyde, butyraldehyde, and isobutyraldehyde.

In one or more embodiments, a molar ratio of the pyrrole monomer of formula (II) to the phenothiazine monomer of formula (I) is in a range of 1:1 to 6:1, preferably 1.5:1 to 5.5:1, preferably 2:1 to 5:1, preferably 2.5:1 to 4.5:1, preferably 3:1 to 4:1. In a preferred embodiment, the pyrrole monomer of formula (II) is present in a molar excess to the phenothiazine monomer of formula (I). Preferably, a molar ratio of the pyrrole monomer of formula (II) to the phenothiazine monomer of formula (I) is in a range of 2.5:1 to 3.5:1, 2.6:1 to 3.4:1, 2.7:1 to 3.3:1, 2.8:1 to 3.2:1, 2.9:1 to 3.1:1, or about 3:1.

In one or more embodiments, a molar ratio of the aldehyde of formula (III) to the phenothiazine monomer of formula (I) is in a range of 3:1 to 12:1, preferably 3.5:1 to 11.5:1, preferably 4:1 to 11:1, preferably 4.5:1 to 10.5:1, preferably 5:1 to 10:1, preferably 5.5:1 to 9.5:1, preferably 6:1 to 9:1, preferably 6.5:1 to 8.5:1, preferably 7:1 to 8:1. In a preferred embodiment, a molar ratio of the aldehyde of formula (III) to the phenothiazine monomer of formula (I) is in a range of 5:1 to 7:1, 5.2:1 to 6.8:1, 5.4:1 to 6.6:1, 5.6:1 to 6.4:1, 5.8:1 to 6.2:1, or about 6:1.

The crosslinked polymer of the present disclosure may have a wide molecular weight distribution. In one embodiment, the crosslinked polymer of the present disclosure has a number average molecular weight of 1-200 kDa, preferably 2-175 kDa, preferably 5-150 kDa, preferably 10-100 kDa, preferably 20-75 kDa, preferably 30-70 kDa, preferably 40-65 kDa, preferably 50-60 kDa.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material.

Specific surface area is a property of solids which is the total surface area of a material per unit of mass, solid or bulk volume, or cross sectional area. In most embodiments, BET surface area is measured by gas adsorption analysis, preferably $N_2$ adsorption analysis. In a preferred embodiment, the crosslinked polymer of the present disclosure has a BET surface area in the range of 300-800 m$^2$/g, preferably 310-600 m$^2$/g, preferably 320-500 m$^2$/g, preferably 330-400 m$^2$/g, preferably 340-380 m$^2$/g, preferably 350-360 m$^2$/g.

The crosslinked polymer disclosed herein in any of its embodiments may be macroporous, mesoporous, or microporous. A porous polymer is one that forms a bulk solid that is porous. The pores exist in the bulk material, not necessarily in the molecular structure of the polymer. The term "microporous" means the pores of the crosslinked polymer have pores with an average pore width (i.e. diameter) of less than 2 nm. The term "mesoporous" means the pores of the crosslinked polymer have an average pore width of 2-50 nm. The term "macroporous" means the pores of crosslinked polymer have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and x-ray computed tomography (XRCT). In a preferred embodiment, the crosslinked polymer is microporous, and has pores with an average pore width of 0.8-2 nm, 0.9-1.5 nm, or 1-1.2 nm. Alternatively, the crosslinked polymer is mesoporous and has pores with an average pore width of 2.5-50 nm, 5-25 nm, or 10-20 nm. However, in certain embodiments, the crosslinked polymer has pores with an average pore width less than 0.8 nm or greater than 50 nm.

A polymer may be loosely described as crystalline if it contains regions of three-dimensional ordering on atomic (rather than macromolecular) length scales, usually arising from intramolecular folding and/or stacking of adjacent chains. A degree of crystallinity may be expressed in terms of a weight fraction of volume fraction of crystalline material. The crystallinity of polymers may be characterized by their degree of crystallinity, ranging from zero for a completely amorphous (non-crystalline) polymer to one for a theoretical completely crystalline polymer. Methods for evaluating the degree of crystallinity include, but are not limited to, differential scanning calorimetry (DSC), X-ray diffraction (XRD), infrared (IR) spectroscopy, and nuclear magnetic resonance (NMR) spectroscopy. The distribution of crystalline and amorphous regions of a polymer may be further visualized with microscopic techniques, such as polarized light microscopy and transmission electron microscopy (TEM). The crosslinked polymer described herein may contain both crystalline and amorphous regions. In one or more embodiments, the crosslinked polymer is amorphous. Alternatively, the crosslinked polymer exhibits a semi-crystalline structure, which has a degree of crystallinity in the range of 0.1-0.8, 0.2-0.6, or 0.3-0.5.

According to a second aspect, the present disclosure relates to a method of making the crosslinked polymer of the first aspect. The method involves the steps of (i) mixing the phenothiazine monomer of formula (I) and the aldehyde of formula (III) in a solution comprising a solvent to form a first mixture, (ii) mixing the pyrrole monomer of formula (II) and an acid with the first mixture to form a second mixture, and (iii) heating the second mixture thereby forming the crosslinked polymer.

In a preferred embodiment, reacting the phenothiazine monomer with the aldehyde and the pyrrole monomer to form the crosslinked polymer is performed in a polar aprotic solvent, preferably in dimethylformamide (DMF). Exemplary polar aprotic solvents that may be used in addition to, or in lieu of DMF include, but are not limited to, tetrahydrofuran, acetonitrile, dimethyl sulfoxide, ethyl acetate, acetone, nitromethane, propylene carbonate, and mixtures thereof. It is equally envisaged that the reaction may be adapted to be performed in a non-polar solvent such as pentane, cyclopentane, hexane, cyclohexane, benzene, toluene, 1,4-dioxane, diethyl ether, and dichloromethane.

In a preferred embodiment, the phenothiazine monomer is present in the second mixture at a concentration in the range of 0.01-5 M, preferably 0.025-4 M, preferably 0.05-3 M, preferably 0.075-2 M, preferably 0.1-1 M, preferably 0.2-0.5 M. In a related embodiment, the aldehyde is present in the second mixture at a concentration in the range of 0.01-30 M, preferably 0.05-20 M, preferably 0.1-10 M, preferably 0.2-5 M, preferably 0.3-2.5 M, preferably 0.4-1 M. In another related embodiment, the pyrrole monomer is present in the second mixture at a concentration in the range of 0.03-60 M, preferably 0.1-30 M, preferably 0.2-10 M, preferably 0.4-5 M, preferably 0.6-4 M, preferably 0.8-2 M.

An acid may be employed as a catalyst for the polycondensation reaction. In one or more embodiments, the acid used herein is a Lewis acid. Non-limiting examples of Lewis acid that may be suitable for the reaction described herein include $FeCl_3$ (ferric chloride), $ZnCl_2$, $AlC_3$, $AlBr_3$, $Me_2AlCl$, $PCl_3$, $BF_3$, $BCl_3$, $BeCl_2$, $TiCl_4$, $SbCl_5$, $SnCl_4$, $SeCl_4$, and $TeCl_4$. In a preferred embodiment, $FeCl_3$ is employed as the acid. In certain embodiments, a protic acid may be used in addition to, or in lieu of $FeCl_3$ which include, but are not limited to, hydrochloric acid, sulfuric acid, nitric acid, phosphoric acid, formic acid, propionic acid, acetic acid, fluoroacetic acid, chloroacetic acid, dichloroacetic acid, trifluoroacetic acid, trichloroacetic acid, citric acid, and hexafluorophosphoric acid. In a preferred embodiment, the acid is present in the second mixture at a concentration in the range of 5-500 mM, 10-200 mM, 20-100 mM, 40-80 mM, or about 60 mM. Alternatively, an alkaline compound such as sodium hydroxide, potassium hydroxide, and other alkali metal hydroxides may be used as the catalyst.

The first mixture comprising the phenothiazine monomer and the aldehyde may be subjected to agitation for 0.5-30 minutes, 1-20 minutes, or 5-10 minutes. The agitation may encompass shaking, stirring, rotating, vibrating, sonication and other means of agitating the mixture. The second mixture may be heated at a temperature of 60-150° C., 70-130° C., 80-110° C., 85-100° C., or 90-95° C. for 1-72 hours, 6-60 hours, 12-48 hours, or 24-36 hours. The second mixture may be agitated throughout the duration of the reaction by employing a rotary shaker, a magnetic stirrer, a centrifugal mixer, or an overhead stirrer. Alternatively, the second mixture is left to stand (i.e. not agitated). In a preferred embodiment, the second mixture is stirred by mechanical stirring, preferably a magnetic stirrer at a speed of 200-1,000 rpm, preferably 300-800 rpm, preferably 400-600 rpm, or about 500 rpm. In one embodiment, the second mixture is sonicated in an ultrasonic bath or with an ultrasonic probe. The heating of the second mixture may be carried out in vacuum, or under an inert gas such as $N_2$, Ar, and He. Preferably the heating is performed under $N_2$.

In a preferred embodiment, the crosslinked polymer is collected as a solid (e.g. powder) that may be separated (filtered off), soaked and washed in methanol and ammonia solution, and then filtered and dried. In one embodiment, the solid may be dried at 25-100° C., preferably 50-90° C., or about 80° C. until a constant weight is achieved. In a preferred embodiment, the reaction disclosed herein has a product yield of at least 75%, preferably at least 80%, preferably at least 85%, preferably at least 90° %, preferably at least 92%, preferably at least 95%. The product yield is calculated as (mass of product/(total mass of reactants-mass of water byproduct))×100%, wherein the mass of water byproduct may be calculated as: molar amount of the aldehyde of formula (II)×molar mass of water.

In the last decade, $CO_2$ capture properties of many microporous organic polymers were investigated [Sevilla, M.; Fuertes, A. B.; Arias, B.; Fermoso, H.; Rubiera, F.; Pis, J. J.; Titirici, M.-M. Sustainable Porous Carbons with a Superior Performance for $CO_2$ Capture. *Energy Environ. Sci.* 2011, 4 (5), 1765; Bhunia, S.; Bhania, P.; Das, S. K.; Sen, T.; Bhaumik, A. Triazine Containing N-Rich Microporous Organic Polymers for CO2 Capture and Unprecedented $CO_2/N_2$ Selectivity. *J. Solid. State Chem.* 2017, 247, 113-119; Kundu, S. K.; Bhaumik, A. Novel Nitrogen and Sulfur Rich Hyper-Cross-Linked Microporous Poly-Triazine-Thiophene Copolymer for Superior $CO_2$ Capture. *ACS Sustain. Chem. Eng.* 2016, 4 (7), 3697-3703; Wang, S.; Song, K.; Zhang, C.; Shu, Y.; Li, T.; Tan, B.; Liu, Z. M.; Liang, W.; Li, A.; Deng, W.; Qiu, S. L.; Zhu, G. S.; Jiang, D. L.; Portis, A. R.; Ragsdale, S. W.; Rauchfuss, T. B.; Reek, J. N. H.; Seefeldt, L. C.; Thauer, R. K.; Waldrop, G. L. A Novel Metalporphyrin-Based Microporous Organic Polymer with High $CO_2$ Uptake and Efficient Chemical Conversion of $CO_2$ under Ambient Conditions. *J. Mater. Chem. A* 2017, S (4), 1509-1515; Gao, H.; Ding, L.; Li, W.; Ma, G.; Bai, H.; Li, L. Hyper-Cross-Linked Organic Microporous Polymers Based on Alternating Copolymerization of Bismaleimide. *ACS Macro Lett.* 2016, S (3), 377-381; and Yao, S.; Yang, X.; Yu, M.; Zhang, Y.; Jiang, J.-X.; Yavuz, C. T.; Coskun, A.; Long, J. R.; Yavuz, C. T.; Simmons, J. M.; Qiu, S. L.; Zhu, G. S. High Surface Area Hypercrosslinked Microporous Organic Polymer Networks Based on Tetraphenylethylene for $CO_2$ Capture. *J. Mater. Chem. A* 2014, 2 (21), 8054, each incorporated herein by reference in their entirety]. Prior studies demonstrated that $CO_2$ capture capability depends on the surface area or the pore nature as well as the functionality of active sites for capturing $CO_2$. The crosslinked polymer disclosed herein may be a suitable material for $CO_2$ capture and separation because of its nitrogen enriched backbone and intrinsic microporosity.

The crosslinked polymer of the present disclosure in any of its embodiments may have a $CO_2$ uptake capacity in a range of 25-45 $cm^3/g$, preferably 28-40 $cm^3/g$, more preferably 30-35 $cm^3/g$ at a temperature of 0-15° C., 2-12° C., or 4-8° C. and a pressure of 400-800 Torr, 500-760 Torr, or 600-700 Torr. In a related embodiment, the crosslinked polymer has a $CO_2$ uptake capacity in a range of 15-25 $cm^3/g$, preferably 18-23 $cm^3/g$, more preferably 20-22 $cm^3/g$ at a temperature of 15-40° C., 20-35° C., or 25-30° C. and a pressure of 400-800 Torr, 500-760 Torr, or 600-700 Torr.

The crosslinked polymer of the present disclosure in any of its embodiments may have a $N_2$ uptake capacity of at least 2.5 $cm^3/g$, at least 3 $cm^3/g$, or at least 3.5 $cm^3/g$, and up to 5 $cm^3/g$, up to 4.5 $cm^3/g$, or up to 4 $cm^3/g$ at a temperature of 0-15° C., 2-12° C., or 4-8° C. and a pressure of 400-800 Torr, 500-760 Torr, or 600-700 Torr. In a related embodiment, the crosslinked polymer has a $N_2$ uptake capacity of at least 0.5 $cm^3/g$, at least 0.8 $cm^3/g$, or at least 1 $cm^3/g$, and up to 1.8 $cm^3/g$, up to 1.5 $cm^3/g$, or up to 1.2 $cm^3/g$ at a temperature of 15-40° C., 20-35° C., or 25-30° C. and a pressure of 400-800 Torr, 500-760 Torr, or 600-700 Torr.

The term "ideal selectivity" refers to a ratio between the uptake capacity of the gases. In one or more embodiments, the crosslinked polymer has an ideal selectivity of $CO_2$ over $N_2$ in a range of 10-60, preferably 20-55, more preferably 40-50. In one embodiment, the ideal selectivity is calculated using Ideal Adsorption Solution Theory (IAST).

According to a third aspect, the present disclosure relates to a method of separating a first gas from a fluid mixture comprising the first gas and a second gas. The method involves the steps of (i) contacting the fluid mixture with the crosslinked polymer of the first aspect, and (ii) adsorbing the first gas onto the crosslinked polymer, thereby separating the first gas from the fluid mixture and forming a first gas loaded crosslinked polymer.

As used herein, adsorption is the adhesion of atoms, ions or molecules from a gas, liquid, or dissolved solid to a surface. The process creates a film of an adsorbate (i.e. the first gas) on the surface of an adsorbent (i.e. the crosslinked polymer). Chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption interaction between the first gas and the crosslinked polymer within the first gas loaded crosslinked polymer may be chemisorption, physisorption, or mixtures thereof. In at least one embodiment, the first gas is adsorbed onto the crosslinked polymer via a physisorption process, meaning the process is primarily physical and preferably no chemical changes occur on the crosslinked polymer or the first gas molecules.

A solid resin of the crosslinked polymer described herein may be optionally crushed to form particles of the crosslinked polymer before contacting the fluid mixture having the first fluid and the second fluid. The crushing process may be carried out by utilizing a grinding method, e.g. fluid energy milling, ball milling, wet milling, and cryogenic grinding.

As used herein, a particle size refers to the longest linear distance measured from one point on the particle though the center of the particle to a point directly across from it. In one embodiment, the crosslinked polymer used herein has an average particle size of 0.1-50 µm in diameter, 1-40 µm, 2-30 µm, 4-20 µm, or 5-10 µm in diameter. Methods for analyzing a distribution of particle size include, but are not limited to, dynamic light scattering (DLS), laser diffraction, ultrasonic attenuation spectroscopy, aerosol mass spectrometry, and sieve analysis. The particle size of a polymer may be further visualized with microscopic techniques, such as polarized light microscopy and scanning electron microscopy (SEM), and dynamic image analysis (DIA). The crosslinked polymer may be freestanding or supported on or within a substrate, for example, a column. Preferably, the crosslinked polymer may be supported within a fixed-bed column.

In one or more embodiments, the contacting is performed by passing the fluid mixture through the crosslinked polymer. Preferably, the contacting is performed by passing the fluid mixture through the crosslinked polymer present in a fixed-bed column (see FIG. 16). Further, it is contemplated that at least 2, 3, 4, or more of the same or different crosslinked polymers disclosed herein may be used in series with one another to further enrich or isolate a targeted gas from a gas mixture. Similarly, the crosslinked polymers may be used in series with other currently known adsorption materials to enrich or isolate a targeted gas from a fluid mixture.

Alternatively, a chamber may be used for the separating method disclosed herein. The chamber used for the present method may be of any shape so long as the crosslinked polymer can be securely housed and utilized inside the chamber to accomplish the gas adsorption and fluid mixture separation. The chamber may also include an inlet configured to accept feed material, a first outlet configured to expel a retentate, and a second outlet configured to expel a permeate. The chamber can be configured to be pressurized so as to push feed material though the inlet, retentate through the first outlet and permeate through the second outlet. The chamber may also include a vacuum pump to provide vacuum or a reduced pressure to the permeate side.

In one or more embodiments, a force is provided to deliver the fluid mixture into contact with the crosslinked polymer. The fluid mixture may have a flow rate of 0.001 L/min to 1,000 L/min, 0.005 L/min to 500 L/min, 0.01 L/min to 100 L/min, 0.05 L/min to 10 L/min, 0.1 L/min to 5 L/min, or 0.5 L/min to 2 L/min. Alternatively, the fluid mixture may stay stagnant over the crosslinked polymer (i.e. as an atmosphere to the crosslinked polymer). In one embodiment, the fluid mixture introduced into contact with the crosslinked polymer has a pressure of 0.5-5 bar, 0.6-4 bar, 0.7-3 bar, 0.8-2 bar, 0.9-1.5 bar, or about 1 bar. In a related embodiment, the fluid mixture introduced has a temperature of −20-60° C., −10-50° C., −4-40° C., 0-30° C., or about 25° C.

In preferred embodiments, the first gas is carbon dioxide ($CO_2$). In a related embodiment, the fluid mixture contains the first gas (i.e. $CO_2$) and a second gas which comprises one or more other gaseous substances including, but not limited to, nitrogen, hydrogen, oxygen, carbon monoxide, hydrocarbons having 1-4 carbon atoms (e.g. methane, ethane, ethylene, acetylene, propane, propylene, butane, iso-butane), nitrogen oxides (i.e. nitric oxide, nitrous oxide, nitrogen dioxide), and noble gases (e.g. helium, neon, argon, krypton, xenon). Alternatively, the method disclosed herein may be applicable to separate other acidic gases such as hydrogen sulfide and sulfur dioxide, as the first gas, in addition to or in lieu of $CO_2$ from a fluid mixture. In preferred embodiments, the second gas is $N_2$. In one embodiment, a volumetric ratio of the first gas (e.g. $CO_2$) to the second gas present in the fluid mixture is in the range of 1:50 to 5:1, preferably 1:40 to 4:1, preferably 1:30 to 3:1, preferably 1:20 to 2:1, preferably 1:10 to 1:1, preferably 1:8 to 1:2, preferably 1:6 to 1:3, or about 1:4.

The most significant obstacle for industrial $CO_2$ capture and treatment is loss of adsorption properties due to the presence of water contamination that competitively binds to the active sites in an adsorbing material. A porous organic polymer (KFUPM-1) was synthesized previously that showed stability under wet conditions (91% relative humidity). Furthermore, the polymer was recyclable for several times without loss of activity, which was demonstrated by a dynamic capacity of 15.1 $cm^3$ $g^{-1}$ under humid conditions [Abdelnaby, M. M.; Alloush, A. M.; Qasem, N. A. A.; Al-Maythalony, B. A.; Mansour, R. B.; Cordova, K. E.; Al Hamouz, O. C. S. Carbon Dioxide Capture in the Presence of Water by an Amine-Based Crosslinked Porous Polymer. *J. Mater. Chem.* A 2018, 6, 6455-6452; and Sumida, K.; Rogow, D. L.; Mason, J. A.; McDonald, T. M.; Bloch, E. D.; Herm, Z. R.; Bae, T.-H.; Long, J. R. Carbon Dioxide Capture in Metal-Organic Frameworks. *Chem. Rev.* 2012, 112 (2), 724-781, each incorporated herein by reference in their entirety].

In one or more embodiments, the fluid mixture further comprises $H_2O$. Importantly, the method of the present disclosure is applicable to fluid mixtures in wet conditions. In one embodiment, $CO_2$ uptake capacity of the crosslinked polymer used herein under at least 50% relative humidity, at least 67% relative humidity, at least 75% relative humidity, at least 85% relative humidity, at least 90% relative humidity, or at least 95% relative humidity is at least 50% greater than $CO_2$ uptake capacity of the crosslinked polymer under dry conditions (i.e. a relative humidity of less than 50%), preferably at least 75% greater, preferably at least 100% greater, preferably at least 150% greater, preferably at least 200% greater than CO2 uptake capacity of the crosslinked polymer under dry conditions (see FIG. 5B).

In some embodiments, the crosslinked polymer is activated through a degassing procedure performed in a sub-atmospheric pressure of 0.05 to 0.8 atm, 0.1 to 0.5 atm, or 0.2-0.4 atm prior to contacting the fluid mixture. The crosslinked polymer may be degassed at a temperature in the range of 10-300° C., 25-200° C., 50-150° C., or about 100° C. for 1-48 hours, 2-36 hours, 8-24 hours, or 12-18 hours.

A stream depleted in the first gas may be obtained after the first gas is adsorbed onto the crosslinked polymer, and/or after the second gas permeates the crosslinked polymer. A composition of the stream depleted in the first gas may vary depending on the composition of the fluid mixture. In some embodiments, the stream depleted in the first gas includes the first gas and the second gas. In one or more embodiments, a volumetric ratio of the first gas (e.g. $CO_2$) to the second gas present in the stream depleted in the first gas is at least 25% less than that present in the fluid mixture, preferably at least 30% less, preferably at least 40% less, preferably at least 50% less, preferably at least 60% less, preferably at least 70% less, preferably at least 80% less, preferably at least 90% less, preferably at least 95% less than that present in the fluid mixture. In a preferred embodiment, the stream depleted in the first gas is substantially free of the first gas, for example, the stream contains less than 100 ppm, preferably less than 10 ppm, preferably less than 1 ppm, preferably less than 1 ppb of the first gas. In a most preferred embodiment, the stream depleted in the first gas is devoid of the first gas.

In one or more embodiments, the method of the present disclosure further involves desorbing the first gas from the first gas loaded crosslinked polymer, and reusing the crosslinked polymer. Preferably, the method involves desorbing the first gas (e.g. $CO_2$) from the first gas loaded crosslinked polymer by flowing or purging an inert gas such as nitrogen ($N_2$), helium, and argon, preferably $N_2$ over the first gas loaded crosslinked polymer to regenerate the crosslinked polymer and reusing the crosslinked polymer. In another preferred embodiment, desorbing the first gas (e.g. $CO_2$) from the first gas loaded crosslinked polymer is performed by flowing a fluid mixture of $N_2$ and water over the first gas loaded crosslinked polymer at a temperature of 4-40° C., 10-30° C., or 15-25° C. for 1-24 hours, 2-12 hours, or 5-6 hours. The crosslinked polymer of the present disclosure may be regenerated (i.e. desorbed) and reused up to 10 cycles without a loss in the first gas (e.g. $CO_2$) uptake capacity, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles (see FIG. 5C). Alternatively, desorbing the first gas (e.g. $CO_2$) involves heating the first gas loaded crosslinked polymer, for example at a temperature of 50-300° C., 75-200° C., or 100-150° C. and optionally collecting the desorbed first gas.

In addition to gas absorption, separation and enrichment, the crosslinked polymer disclosed herein may be used in separation of fluid mixtures by pervaporation, water treatment, air purifiers, chemical filters, oil and gas refineries, fermenters, and bioreactors.

The examples below are intended to further illustrate protocols for preparing, characterizing and utilizing the crosslinked polymer, and are not intended to limit the scope of the claims.

Example 1

Materials and Methods

Pyrrole (98% purity), methanol (99.9% purity), and N,N-dimethylformamide (99% purity) were purchased from Sigma Aldrich Co. Anhydrous iron(III) chloride (≥99.99% purity) was obtained from Alpha Chemika. Phenothiazine (98% purity) and paraformaldehyde (≥99% purity) were purchased from Fluka. Ammonium hydroxide (28-30 w/w %) was purchased from Fisher Scientific. Pyrrole was distilled under $N_2$ flow at 145° C. prior to use. Other chemicals were used without further purification unless otherwise mentioned. For gas sorption measurements, ultrahigh purity grade nitrogen (99.999%), helium (99.999%), and high purity $CO_2$ (99.9%) were obtained from Abdullah Hashem Industrial Co., Dammam, Saudi Arabia.

Solid state $^{13}C$ nuclear magnetic resonance (NMR) spectroscopy measurements were measured on a Bruker 400 MHz spectrometer operating at 125.65 MHz (11.74 T) and at ambient temperature (298 K). Samples were packed into 4 mm $ZrO_2$ rotors and cross-polarization magic angle spinning (CP-MAS) was employed with a magic angle spinning rate of 14 kHz. Fourier-transform infrared (FT-IR) spectroscopy measurements were performed on a PerkinElmer 16 PC spectrometer using KBr pellets. The spectra were recorded over 4000-600 $cm^{-1}$ in transmission mode and the output signals were described as follows: s, strong; m, medium; w, weak; and br, broad. CHN analysis was carried out at PerkinElmer (EA-2400) elemental analyzer. Thermal gravimetric analysis (TGA) was run on a TA Q-500 instrument with a platinum pan sample holder under. About 10 mg of sample was heated under air flow with heating rate at 10° C. per min. Powder X-ray diffraction (PXRD) measurements were recorded on a Rigaku MiniFlex II X-ray diffractometer with Cu $K_\alpha$ radiation ($\lambda$=1.54178 Å). Field emission scanning electron microscope (FE-SEM) images were taken on a Tescan LYRA3 Dual Beam microscope at an acceleration voltage of 10 kV. Low pressure nitrogen sorption isotherms were undertaken using a Quantachrome QUADRASOROB evo instrument. A liquid nitrogen bath was used for the measurements at 77 K. $CO_2$ sorption isotherms were measured on an Autosorb iQ2 volumetric gas adsorption analyser. The measurement temperatures at 273 and 298 K were controlled with a water circulator.

Example 2

General Synthetic Procedure

The molar ratio of the phenothiazine to the pyrrole was varied from 1:1 to 1:4 to select KFUPM polymers with high surface area and narrow pores. All reactions were carried out in dimethylformamide (DMF) as the solvent and 10 moles % $FeCl_3$ as the catalyst forming the linker.

Example 3

Synthesis of KFUPM-2

Phenothiazine (0.40 g, 2.00 mmol) and paraformaldehyde (0.36 g, 12.0 mmol) were added to 20 mL DMF in a 50 m round bottom flask and stirred at room temperature for 5 min. Pyrrole (0.40 g, 6.00 mmol) was subsequently added to the reaction mixture and stirred for an additional 5 min. The flask was then purged with $N_2$ for 2-3 min and ferric chloride ($FeCl_3$, 0.194 g, 1.20 mmol) was added under inert atmosphere and subsequently the flask was sealed with a rubber septum. The flask was heated by a preheated oil bath at 90° C. with continuous stirring for 24 h at a rate of 500 rpm (a black solid was formed after 5 min). The resulting solid was washed with 20 mL of methanol followed by sonication for 30 min. The solid was continuously washed with 30 mL of methanol two times per day for 2 days with stirring. Then the solid was immersed in an ammonia solution (25% w/w) for 24 h, 40 mL distilled water for 24 h, and 30 mL of methanol per day for 2 days with stirring, until a clear filtrate solution was obtained. Finally, the product was dried at 80° C. in an oven for 12 h. The final yield (0.87 g) was 92% based on the monomers weights (after excluding the equivalent amount of water as by-product). Elemental Analysis: calculated C, 75.76, H, 5.72, N, 11.78, S, 6.74; Found C, 51.47, H, 3.24, N, 10.07, S, 1.79. FT-IR (KBr, cm-1): 3430 (br), 2920 (w), 2860 (w), 1620 (w), 1410 (w), 1020 (w), and 747 (w).

Example 4

Structural Characterizations

The resulting polymer products were structurally characterized using combined data from solid state $^{13}C$-NMR, FT-IR, as well as elemental analysis. Elemental analysis of the KFUPM-2 polymer showed a deviation from the expected values which could be attributed to incomplete combustion during the analysis, trapped adsorbate species (i.e. gases and water vapour), as well as irregularities of the polymer structure itself. Similar observations were found in other reported porous polymers Luo, Y.; Li, B.; Wang, W.; Wu, K.; Tan, B. Hypercrosslinked Aromatic Heterocyclic Microporous Polymers: A New Class of Highly Selective $CO_2$ Capturing Materials. *Adv. Mater.* 2012, 24 (42), 5703-5707; Ren, S.; Bojdys, M. J.; Dawson, R.; Laybourn, A.; Khimyak, Y. Z.; Adams, D. J.; Cooper, A. I. Porous, Fluorescent, Covalent Triazine-Based Frameworks Via Room-Temperature and Microwave-Assisted Synthesis. *Adv. Mater.* 2012, 24 (17), 2357-2361; and Xu, Y.; Chen, L.; Guo, Z.; Nagai, A.; Jiang, D. Light-Emitting Conjugated Polymers with Microporous Network Architecture: Interweaving Scaffold Promotes Electronic Conjugation, Facilitates Exciton Migration, and Improves Luminescence. *J. Am. Chem. Soc.* 2011, 133 (44), 17622-17625, each incorporated herein by reference in their entirety].

The $^{13}C$ NMR spectra (FIG. 1) showed characteristic peaks that elucidated the connectivity between the phenothiazine pyrrole moieties, which was a direct prove for the formation of the copolymer. Peaks at 27, 32, and 38 ppm assigned to $CH_2$ (aliphatic C 1, 2, &3) connected to the pyrrole rings and the pyrrole and phenothiazine rings respectively, broad peaks at 123 ppm assigned to aromatic carbons (C 4, 5, 6, & 7), as well as the broad peak centred at 134 ppm assigned for the aromatic C atoms (C 7, 8, 9, 10, &11) from the alpha position of the N atom for the pyrrole and phenothiazine moieties clearly confirmed the incorporation of the two monomers into the final polymer networks.

Figure 3:
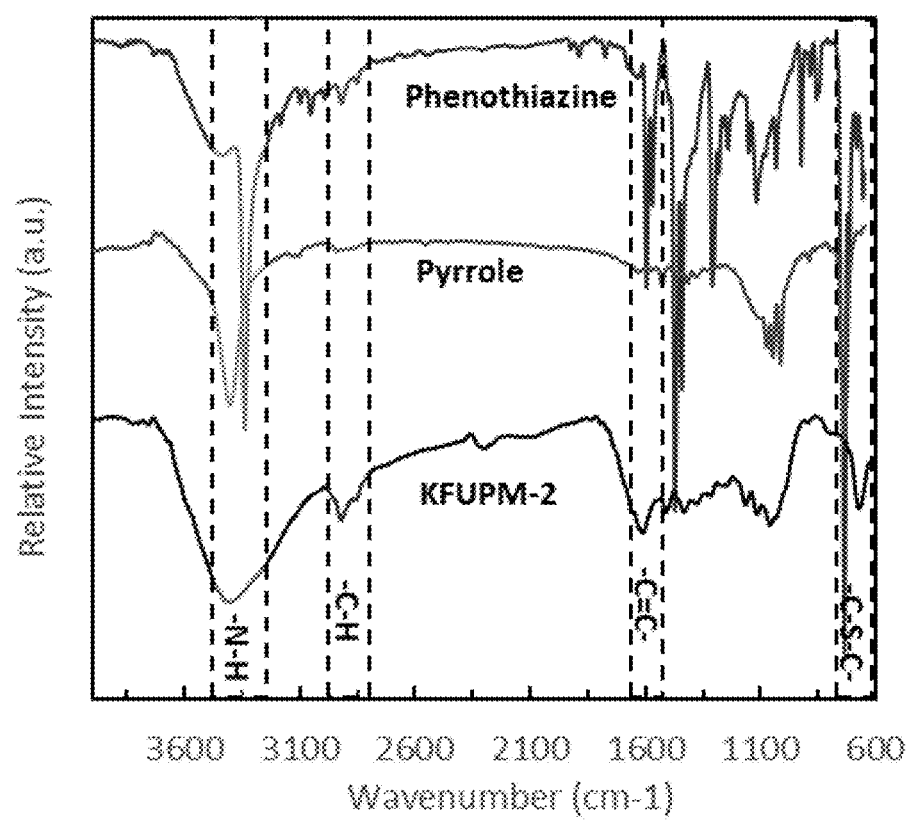
FIG. 3 is an overlay of Fourier transform infrared (FT-IR) spectra of phenothiazine monomer, pyrrole monomer, and the crosslinked polymer KFUPM-2, respectively.

FT-IR spectra of KFUPM-2 (FIG. 3) showed absorption bands at ~3413 $cm^{-1}$ attributed to the —NH— stretching vibration present in pyrrole and phenothiazine. The absorption bands at ~2918 $cm^{-1}$ were assigned to the methylene —CH stretch specific for $CH_2$ linkage between the pyrrole and phenothiazine moieties. The —C=C— absorption bands ~1600 cm$^{-1}$ were assigned to the aromatic rings present in pyrrole and phenothiazine moieties. The —C—S—C— absorption band at 490 cm was found in the phenothiazine moiety [Warren, R. J., et al., *Spectra-Structure Correlations of Phenothiazines by Infrared, Ultraviolet, and Nuclear Magnetic Resonance Spectroscopy*. Journal of Pharmaceutical Sciences, 1966. 55(2): p. 144-150; and Schlereth, D. D. and A. A. Karyakin, *Electropolymerization of phenothiazine, phenoxazine and phenazine derivatives: Characterization of the polymers by UV-visible difference spectroelectrochemistry and Fourier transform IR spectroscopy*. Journal of Electroanalytical Chemistry, 1995. 395(1): p. 221-232]. The PXRD pattern of KFUPM-2 showed the cross-linked polymer was amorphous in nature with a broad peak at ~22 2θ. A small peak at ~35 2θ indicated the existence of iron oxide that could not be removed by the treatment of the polymeric material. Thermogravimetric analysis of KFUPM-2 showed exceptional thermal stability at up to ~460° C., owing its stability to the high degree of cross-linking between the phenothiazine and pyrrole moieties within the polymer network of KFUPM-2.

Example 5

Porosity and Surface Area

Figure 4A:
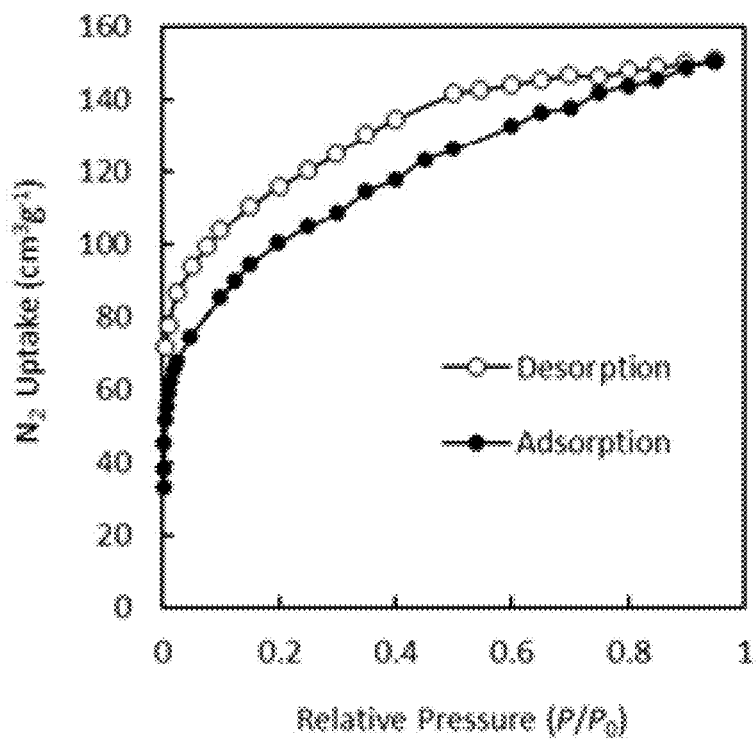
FIG. 4A is a graph illustrating $N_2$ isotherms of the crosslinked polymer KFUPM-2 measured at 77 K.
Figure 4B:
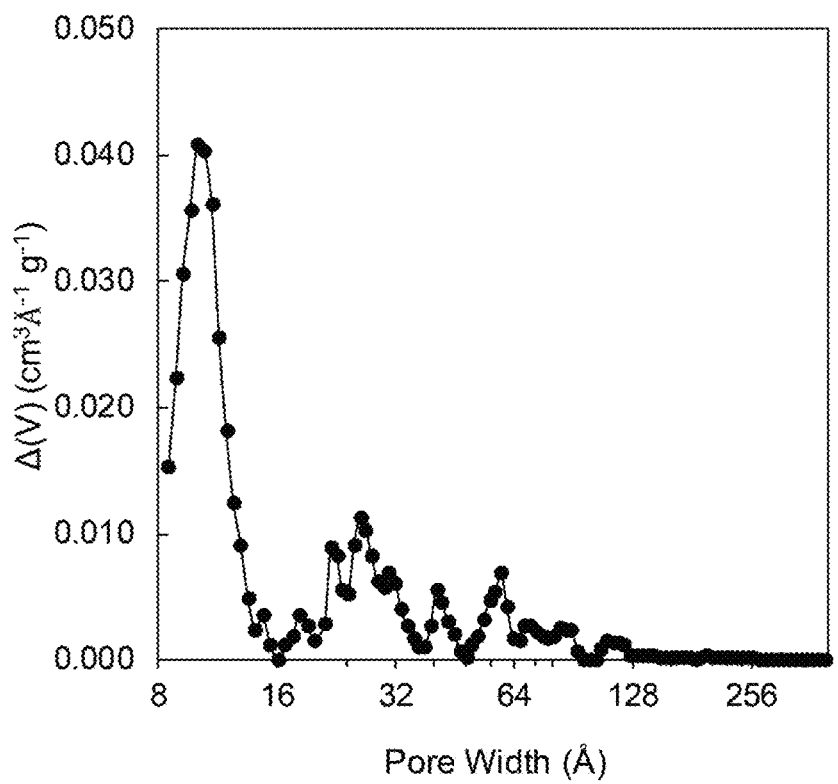
FIG. 4B is a graph showing pore size distribution of the crosslinked polymer KFUPM-2.

The textural and surface properties of KFUPM-2 were determined by $N_2$ sorption measurements at 77 K (FIG. 4A). From the figure, a sharp uptake at a low relative pressure ($P/P_0<0.001$) indicates a predominance of microporous nature of type I isotherm according to the IUPAC classification [Dey, S.; Bhunia, A.; Esquivel, D.; Janiak, C.; Mastalerz, M.; Xia, H.; Mu, Y.; Xiong, X.; Pan, C.; Li, S.; Qiu, S.; Zhu, G. Covalent Triazine-Based Frameworks (CTFs) from Triptycene and Fluorene Motifs for $CO_2$ Adsorption. *J. Mater. Chem. A* 2016, 4 (17), 6259-6263; and Thommes, M.; Kaneko, K.; Neimark, A. V.; Olivier, J. P.; Rodriguez-Reinoso, F.; Rouquerol, J.; Sing, K. S. W. Physisorption of Gases, with Special Reference to the Evaluation of Surface Area and Pore Size Distribution (IUPAC Technical Report). *Pure Appl. Chem.* 2015, 87 (9-10), 1051-1069]. The isotherm for KFUPM-2 showed hysteresis during the desorption which could be attributed to the elastic deformation or swelling of the polymeric network [Weber, J.; Antonietti, M.; Thomas, A. Microporous Networks of High-Performance Polymers: Elastic Deformations and Gas Sorption Properties. *Macromolecules* 2008, 41 (8), 2880-2885]. The BET surface area (at $P/P_0=0.01-0.3$) of KFUPM-2 was found to be 352 m$^2$ g$^{-1}$. The pore size distribution was calculated using QSDFT models (FIG. 4B) confirms the microporosity <20 of the material with some >20 mesoporous.

Example 6

Gas Adsorption Properties: Thermodynamic Uptake Capacity

Figure 4C:
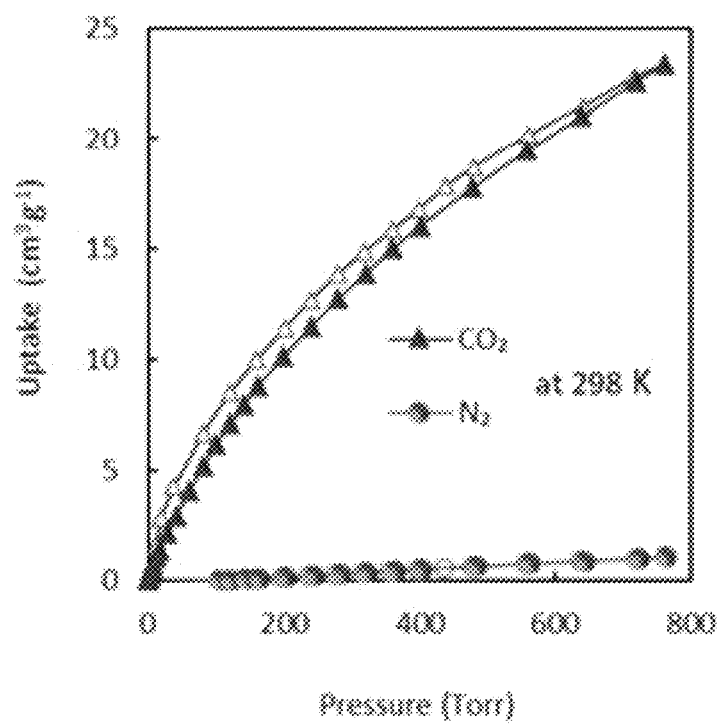
FIG. 4C is an overlay of $CO_2$ and $N_2$ isotherms of the crosslinked polymer KFUPM-2 (filled and open symbols represent adsorption and desorption branches, respectively).

The thermodynamic gas adsorption properties of the KFUPM-2 polymer were analyzed at 273 and 298 K (FIG. 4C). The isotherms exhibit a reversible adsorption and desorption with small hysteresis, indicating a greater interaction of $CO_2$ with the material. KFUPM-2 exhibited large $CO_2$ uptake capacities of 39.1 cm$^3$ g$^{-1}$ at 273 K and 760 Torr, and 23.3 cm$^3$ g$^{-1}$ at 298K and 760 Torr, respectively. However, low $N_2$ uptake capacities were found under the same condition (5.1 and 1.0 cm$^3$ g$^{-1}$ at 273 and 298 K, respectively, and 760 Torr). It was clearly seen that the initial slopes of the $CO_2$ isotherms were sharper than that of $N_2$, reflecting a higher affinity of the material toward $CO_2$ compared to $N_2$, which demonstrated the potential use of KFUPM-2 as a selective adsorbent for $CO_2$ from flue gas. The $CO_2$ uptake capacity of KFUPM-2 at 273 K is comparable with or higher than those of reported crystalline covalent frameworks COFs (COF-1: 51.9 cm$^3$ g$^{-1}$, COF-5: 29.9 cm$^3$ g$^{-1}$, COF-8: 32.0 cm$^3$ g$^{-1}$, and COF-10: 27.0 cm$^3$ g$^{-1}$) [Furukawa, H.; Yaghi, O. M. Storage of Hydrogen, Methane, and Carbon Dioxide in Highly Porous Covalent Organic Frameworks for Clean Energy Applications. *J. Am. Chem. Soc.* 2009, 131 (25), 8875-8883] and comparable with other porous organic polymers such as NUT-1 (36.8 cm$^3$ g$^{-1}$) [Mane, S.; Gao, Z.-Y.; Li, Y.-X.; Xue, D.-M.; Liu, X.-Q.; Sun, L.-B. Fabrication of Microporous Polymers for Selective $CO_2$ Capture: The Significant Role of Crosslinking and Crosslinker Length. *J. Mater. Chem. A* 2017, 5 (44), 23310-23318], CMP-1 (29.6 cm$^3$ g$^{-1}$) [Dawson, R.; Stöckel, E.; Holst, J. R.; Adams, D. J.; Cooper, A. I. Microporous Organic Polymers for Carbon Dioxide Capture. *Energy Environ. Sci.* 2011, 4 (10), 4239], and PPN-6-$CH_2Cl$ (28.6 cm$^3$ g$^{-1}$) [Lu, W.; Sculley, J. P.; Yuan, D.; Krishna, R.; Wei, Z.; Zhou, H.-C. Polyamine-Tethered Porous Polymer Networks for Carbon Dioxide Capture from Flue Gas. *Angew. Chemie Int. Ed.* 2012, 51 (30), 7480-7484].

Example 7

Coverage Dependent Enthalpy of Adsorption ($Q_{st}$)

The $Q_{st}$ estimates the affinity of an absorbent toward specific gas molecules. This property is intrinsic for a material regardless of the temperature. A virial-type expression comprising temperature independent parameters a, and b was used to correlate between two different single component isotherms of the targeted gas at two different temperatures (273 K and 298 K). The virial-type equation used is [Sumida, K.; Rogow, D. L.; Mason, J. A.; McDonald, T. M.; Bloch, E. D.; Herm, Z. R.; Bae, T.-H.; Long, J. R. Carbon Dioxide Capture in Metal-Organic Frameworks. *Chem. Rev.* 2012, 112 (2), 724-781]:

$$\text{Ln}(p) = \ln(v) + \frac{1}{T}\sum_{i=0}^{m}(a_i\ v_i) + \sum_{i=0}^{n}(b_i\ v_i) \quad (1)$$

where P is pressure (Pa), v is the adsorbed amount (mol/g), $a_i$ and $b_j$ are the virial coefficient, T is temperature, and m and n represent the number of coefficients required to describe the isotherms.

Example 8

Selectivity

The selectivity of the synthesized crosslinked polymer (KFUPM-2) toward $CO_2$ and $N_2$ was estimated using Henry's model which describes the gas adsorption on solid as a linear relation. The Henry's isotherm equation is [Drage, T. C.; Smith, K. M.; Pevida, C.; Arenillas, A.; Snape, C. E. Development of Adsorbent Technologies for Post-Combustion $CO_2$ Capture. *Energy Procedia* 2009, 1 (1), 881-884]:

$$q = kP \quad (2)$$

where q is the adsorbed amount of gas per unit mass of the material (cc/g), P is the adsorbate gas pressure (torr), and k is the Henry's law constant (cc/g·torr).

Example 9

Calculation of CO2/$N_2$ IAST Selectivity

In order to calculate the $C_2/N_2$ selectivity of the synthesized polymers, the Ideal Adsorbed Solution Theory (IAST)

was used to estimate the composition of the adsorbed phase from pure component isotherms and predict the selectivity of the binary mixture $CO_2/N_2$. IAST model assumes an ideal behaviour to represent the relationship between the bulk gas phase and adsorbed phase as:

$$y_i P_t = x_i P_i \quad (3)$$

where $P_t$ is the total pressure of gas mixture in the bulk phase, $P_i$ is the standard state pressure of pure component i which yields the same spreading pressure as that of the mixture at the same temperature, y is the bulk phase molar fraction, and x is adsorbed phase molar fraction.

For two components (a and b), the equilibrium obtained from the spreading pressure results in:

$$\int_0^{P_a} \frac{q_a}{P} dP = \int_0^{P_b} \frac{q_b}{P} dP \quad (4)$$

Combining Eq. (3) and (4) resulting in:

$$\int_0^{\frac{y_a P_t}{x_a}} \frac{q_b}{P} dP = \int_0^{\frac{y_b P_t}{x_b}} \frac{q_b}{P} dP \quad (5)$$

The molar fraction of a mixture should be unity.

$$y_a + y_b = 1 \quad (6)$$

$$x_a + x_b = 1 \quad (7)$$

Here, $q_a$ and $q_b$ are the adsorption isotherms of components a and b, which can be fitted from experimental data using dual-site *Langmuir* method as:

$$q_i = \frac{q_{max1,i} K1_i y_i P_t}{1 + K1_i y_i P_t} + \frac{q_{max2,i} K2_i y_i P_t}{1 + K2_i y_i P_t} \quad (8)$$

where $q_{max1,i}$ and $q_{max2,i}$ are the saturation capacity of component i (a or b) and K1 an K2 is the affinity constant.

Given $P_t$, y, $q_{max}$ and K, there is only one unknown variable quantity x which can be solved by MATLAB software. The selectivity can, then, be estimated as:

$$S = \frac{x_a/y_a}{x_b/y_b} \quad (9)$$

Example 10

Breakthrough Experiments

Figure 16:
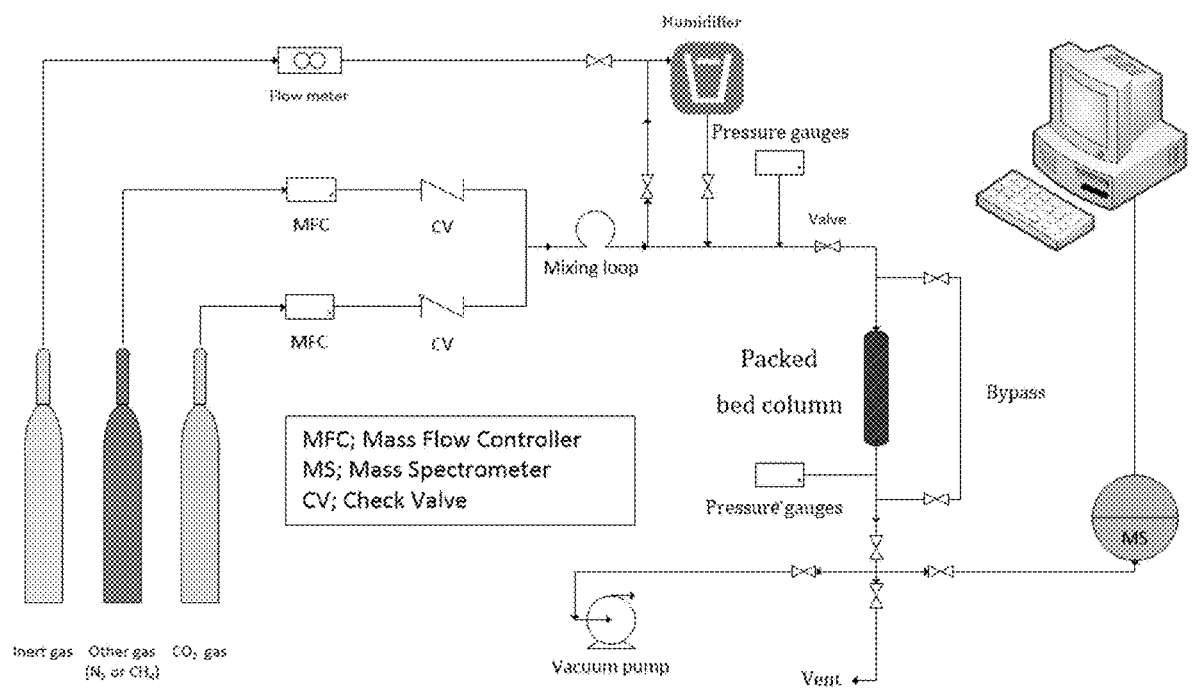
FIG. 16 is a schematic representation of the column breakthrough experiment.

A dynamic breakthrough setup as shown in FIG. 16 was used to separate $CO_2$ from different gas mixtures with concentrations representing industrial flue gas stream. The required gas mixture could be controlled by the mass flow controllers then mixed through the mixing loop before passing through a fixed bed packed with the KFUPM-2 material. A fixed stainless-steel column of 4 mm inner diameter, 6 mm outer diameter, and 7 cm length was filled with the KFUPM-2 sample (0.63 g). The column down streams was monitored using a mass spectrometer. A heating jacket and vacuum pump have been used for regeneration purpose. The wet gas streams (91% relative humidity) were carried out by passing the gas mixture through water vapour saturator (humidifier) at 25° C. until saturation was detected by the mass spectrometer.

Example 11

Breakthrough Measurements

A fixed bed was packed with KFUPM-2 powder (0.83 g) and the sample was activated at 373 K for 24 hours under vacuum prior to carrying out the measurements. The breakthrough experiments were conducted under ambient conditions (298 K and 1 bar) with a 10 sccm flowrate of $CO_2:N_2$ (20:80 v/v) feed mixture. For the measurements under humid conditions, a dry $N_2$ gas stream was passed through water humidifier at room temperature then was flown through the sample bed, in which the water level in the gas stream was monitored until saturation was obtained as detected by mass spectrometry (91% relative humidity was obtained). At this point, dry $CO_2$ was introduced into the wet $N_2$ stream with the same flowrate using the drying conditions noted above. The full dynamic capacity of $CO_2$ and $N_2$ was estimated by evaluating the ratio of compositions of the downstream gas and the feed gas. The regeneration of the sample was done by flowing pure wet $N_2$ through the sample bed at room temperature for 5-6 h.

Example 12

Figure 4D:
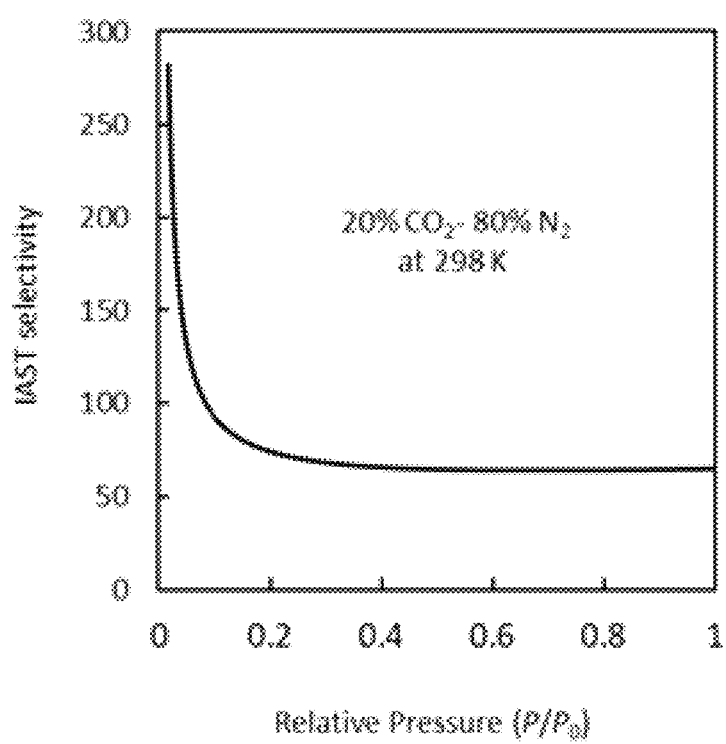
FIG. 4D is a graph showing $CO_2/N_2$ selectivity of the crosslinked polymer KFUPM-2 calculated by the ideal adsorption solution theory (IAST).

Gas Adsorption Properties: Coverage-Dependent Enthalpy of Adsorption and $CO_2/N_2$ Selectivity After the thermodynamic $CO_2$ and $N_2$ adsorption measurement results were obtained, the relationship between KFUPM-2 and $CO_2$ was further investigated. The coverage-dependent enthalpy of adsorption ($Q_{st}$) for $CO_2$ was estimated by fitting the isotherms collected at 273 and 298 K with a virial-type expansion equation (Example 7). The resulting initial $Q_{st}$ value was calculated to be 34 kJ mol$^{-1}$, which quantifiably reflected a strong binding affinity of KFUPM-2 material to CO2. It was observed that the $Q_{st}$ decreased as the $CO_2$ uptake increased due to the occupation of $CO_2$ active sites. The $Q_{st}$ value is moderately high for physisorption-driven materials as compared to related materials such as BILP-1 (26.5 k mol$^{-1}$) [Ren, S.; Bojdys, M. J.; Dawson, R.; Layboun, A.; Khimyak, Y. Z.; Adams, D. J.; Cooper, A. I. Porous, Fluorescent, Covalent Triazine-Based Frameworks Via Room-Temperature and Microwave-Assisted Synthesis. *Adv. Mater.* 2012, 24 (17), 2357-2361], Azo-COP-1 (29.3 kJ mol$^{-1}$) [Xu, Y.; Chen, L.; Guo, Z.; Nagai, A.; Jiang, D. Light-Emitting Conjugated Polymers with Microporous Network Architecture: Interweaving Scaffold Promotes Electronic Conjugation, Facilitates Exciton Migration, and Improves Luminescence. *J. Am. Chem. Soc.* 2011, 133 (44), 17622-17625], and PAF-1 (15.6 kJ mol$^{-1}$) [Thommes, M.; Kaneko, K.; Neimark, A. V.; Olivier, J. P.; Rodriguez-Reinoso, F.; Rouquerol, J.; Sing, K. S. W. Physisorption of Gases, with Special Reference to the Evaluation of Surface Area and Pore Size Distribution (IUPAC Technical Report). *Pure Appl. Chem.* 2015, 87 (9-10), 1051-1069]. With these results, the high $Q_{st}$ values were within the favorable range for a strong enough but reversible adsorption-desorption for efficient $CO_2$ separations, which landed squarely in the physisorption range [Zou, L.; Sun, Y.; Che, S.; Yang, X.; Wang, X.; Bosch, M.; Wang, Q.; Li, H.; Smith, M.; Yuan, S.; Perry, Z.; Zhou, H.-C. Porous Organic Polymers for Post-Combustion Carbon Capture. *Adv. Mater.* 2017, 1700229; and Nugent, P.; Belmabkhout, Y.; Burd, S. D.; Cairns, A. J.; Luebke, R.; Forrest, K.; Pham, T.; Ma, S.; Space, B.; Wojtas, L.; Eddaoudi, M.; Zaworotko, M. J. Porous Materials with Optimal Adsorption Thermodynamics and Kinetics for CO2 Separation. *Nature* 2013, 495 (7439), 80-84]. This clearly indicates that KFUPM-2 works as a physisorption material and can be simply regenerated at mild conditions. The $CO_2/N_2$ selectivity of the KFUPM-2 was then estimated using Ideal Adsorption Solution Theory (IAST) model. KFUPM-2 showed remarkably good selectivity for $CO_2/N_2$ of 64 for a mixture of 20% $CO_2$ and 80% $N_2$ at pressures varying from 0 to 1 atm (FIG. 4D), which was comparable with other porous organic polymers (see Table 1).

tion. *Angew. Chem. Int. Ed. Engl.* 2015, 54 (10), 2986-2990; H) Zhao, Y.; Yao, K. X.; Teng, B.; Zhang, T.; Han, Y. A Perfluorinated Covalent Triazine-Based Framework for Highly Selective and Water-tolerant $CO_2$ Capture. *Energy Environ. Sci.* 2013, 6 (12), 3684; I) Patel, H. A.; Je, S. H.; Park, J.; Chen, D. P.; Jung, Y.; Yavuz, C. T.; Coskun, A. Unprecedented High-Temperature CO2 Selectivity in N2-Phobic Nanoporous Covalent Organic Polymers. *Nat. Commun.* 2013, 4, 1357; J) Nguyen, N. T. T.; Lo, T. N. H.; Kim, J.; Nguyen, H. T. D.; Le, T. B.; Cordova, K. E.; Furukawa, H. Mixed-Metal Zeolitic Imidazolate Frameworks and Their Selective Capture of Wet Carbon Dioxide over Methane. *Inorg. Chem.* 2016, 55 (12), 6201-6207; K)

TABLE 1

Dynamic $CO_2$ capture properties under wet conditions for KFUPM-1 in comparison with similarly related high-performing adsorbents

| Material | $SA_{BET}$ ($m^2\,g^{-1}$) | $CO_2$ Uptake ($cm^3\,g^{-1}$)[a] | $CO_2/N_2$ Selectivity[b] | $CO_2$ Uptake Capacity - Dry ($cm^3\,g^{-1}$)[c] | Dynamic $CO_2$ Uptake Capacity - Wet ($cm^3\,g^{-1}$)[c] | Regeneration Temp. | Ref. |
|---|---|---|---|---|---|---|---|
| NUT-6 | 1138 | 83.5 | 338 | — | — | 333 | A |
| NUT-10 | 100[d] | 40.2 | 159 | — | — | 333 | B |
| PAF-26-COOH | 717 | 31.3 | 29 | — | — | — | C |
| PPN-6-SO3NH4 | 593 | 81 | 196 | 25.8[b] | — | 363 | D |
| CTF-FUM-350 | 230 | 57.2 | 102 | 11.4 | — | — | E |
| CTF-DCN-500 | 735 | 38.4 | 37 | 8.3 | — | — | E |
| LZU-301 | 654 | 35.6 | — | 4.9 | 8.2 | 373 | F |
| [HO2C] 100%-H2P-COF | 364 | 76 | 77 | 16.4 | — | 353[e] | G |
| FCTF-1 | 662 | 72 | 31 | 16.1 | 14.2 | 298[f] | H |
| Azo-COP-1 | 635 | 32 | 96 | — | — | 298 | I |
| BPL Carbon | 1210 | 47 | — | 6.0 | 4.2 | — | J |
| Carbon Monolith (HCM-DAH-1) | 670 | 58.2 | 28 | 20.9 | 20.3 | 298 | K |
| KFUPM-1 | 305 | 234 | 141 | 8.5 | 15.1 | 298 | L |
| KFUP1v1-2 | 352 | 23.3 | 64 | 9.7 | 32 | 298 | This work |

[a]At 298 K and 760 Torr.
[b]Calculated by Ideal Adsorbed Solution Theory at 298 K and 1 bar.
[c]Calculated from dynamic breakthrough experiments.
[d]Calculated from $CO_2$ isotherms at 273K,
[e]Regenerated under vaccuum.
[f]At 313 K. Those properties that were not reported are identified with "—".

References: A) Mane, S.; Gao, Z.-Y.; Li, Y.-X.; Xue, D.-M.; Liu, X.-Q.; Sun, L.-B. Fabrication of Microporous Polymers for Selective $CO_2$ Capture: The Significant Role of Cross-linking and Crosslinker Length. *J. Mater. Chem. A* 2017, 5 (44), 23310-23318; B) Mane, S.; Gao, Z.-Y.; Li, Y.-X.; Liu, X.-Q.; Sun, L.-B. Rational Fabrication of Polyethylenimine-Linked Microbeads for Selective $CO_2$ Capture. *Ind. Eng. Chem. Res.* 2018, 57 (1), 250-258; C) Ma, H.; Ren, H.; Zou, X.; Meng, S.; Sun, F.; Zhu, G. Post-Metalation of Porous Aromatic Frameworks for Highly Efficient Carbon Capture from $CO_2+N_2$ and $CH_4++N_2$ Mixtures. *Polym. Chem.* 2014, 5 (1), 144-152; D) Lu, W.; Verdegaal, W. M.; Yu, J.; Balbuena, P. B.; Jeong, H.-K.; Zhou, H.-C. Building Multiple Adsorption Sites in Porous Polymer Networks for Carbon Capture Applications. *Energy Environ. Sci.* 2013, 6 (12), 3559; E) Wang, K.; Huang, H.; Liu, D.; Wang, C.; Li, J.; Zhong, C. Covalent Triazine-Based Frameworks with Ultramicropores and High Nitrogen Contents for Highly Selective $CO_2$ Capture. *Environ. Sci. Technol.* 2016, 50 (9), 4869-4876; F) Ma, Y.-X.; Li, Z.-J.; Wei, L.; Ding, S.-Y.; Zhang, Y.-B.; Wang, W. A Dynamic Three-Dimensional Covalent Organic Framework. *J. Am. Chem. Soc.* 2017, 139, 4995-4998; G) Huang, N.; Chen, X.; Krishna, R.; Jiang, D. Two-Dimensional Covalent Organic Frameworks for Carbon Dioxide Capture through Channel-Wall Functionaliza- Hao, G.-P.; Li, W.-C.; Qian, D.; Wang, G.-H.; Zhang, W.-P.; Zhang, T.; Wang, A.-Q.; Schüth, F.; Bongard, H.-J.; Lu, A.-H. Structurally Designed Synthesis of Mechanically Stable Poly(benzoxazine-Co-Resol)-Based Porous Carbon Monoliths and Their Application as High-Performance $CO_2$ Capture Sorbents. *J. Am. Chem. Soc.* 2011, 133 (29), 11378-11388; L) Abdelnaby, M. M.; Alloush, A. M.; Qasem, N. A. A.; Al-Maythalony, B. A.; Mansour, R. B.; Cordova, K. E.; Al Hamouz, O. C. S. Carbon Dioxide Capture in the Presence of Water by an Amine-Based Crosslinked Porous Polymer. *J. Mater. Chem. A* 2018, 6, 6455-6452, each incorporated herein by reference in their entirety.

Figure 5A:
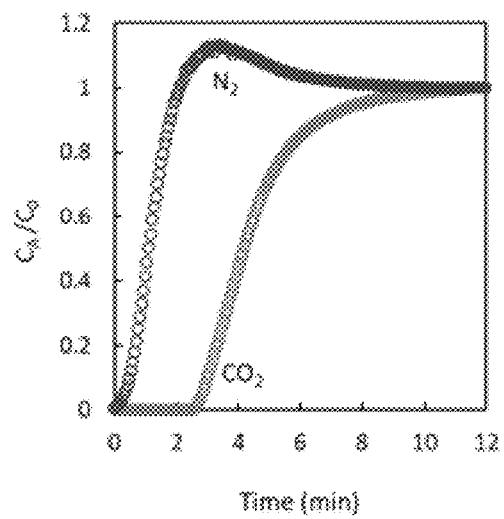
FIG. 5A is a graph showing breakthrough curves of $CO_2$ and $N_2$ after flowing a gas mixture containing $CO_2$ and $N_2$ at a 20:80 ratio through the crosslinked polymer KFUPM-2 under dry conditions.

In order to confirm the effectiveness of KFUPM-2 material in separating $CO_2$ from practical industrial gas mixtures, dynamic breakthrough experiments were carried out for KFUPM-2. Firstly, an activated dry sample of KFUPM-2 was subjected to a dry gas mixture stream of 20% (v/v) $CO_2$ and 80% (v/v) $N_2$. The experimental breakthrough curves (FIGS. 5A and 5B) indicating that $CO_2$ was retained while $N_2$ passed through the bed clearly demonstrated the selectivity and affinity of KFUPM-2 polymer for $CO_2$ over $N_2$. The $CO_2$ capacity calculated from the respective breakthrough curves was estimated to be about 9.7 $cm^3\,g^{-1}$ for dry $CO_2/N_2$ mixture, which is comparable with other porous polymers with a larger surface area (CTF-FUM-350 and CTF-DCN-500 are 11.4 and 8.3 $cm^3\ g^{-1}$, respectively) [Wang, K.; Huang, H.; Liu, D.; Wang, C.; Li, J.; Zhong, C. Covalent Triazine-Based Frameworks with Ultramicropores and High Nitrogen Contents for Highly Selective $CO_2$ Capture. *Environ. Sci. Technol.* 2016, 50 (9), 4869-4876] and greater than some other COFs (LZU-301, 4.9 $cm^3\ g^{-1}$) [Ma, Y.-X.; Li, Z.-J.; Wei, L.; Ding, S.-Y.; Zhang, Y.-B.; Wang, W. A Dynamic Three-Dimensional Covalent Organic Framework. *J. Am. Chem. Soc.* 2017, 139, 4995-4998] and commercially available BPL Carbon (6.0 cm $g^{-1}$) [Nguyen, N. T. T.; Lo, T. N. H.; Kim, J.; Nguyen, H. T. D.; Le, T. B.; Cordova, K. E.; Furukawa, H. Mixed-Metal Zeolitic Imidazolate Frameworks and Their Selective Capture of Wet Carbon Dioxide over Methane. *Inorg. Chem.* 2016, 55 (12), 6201-6207].

Figure 5B:
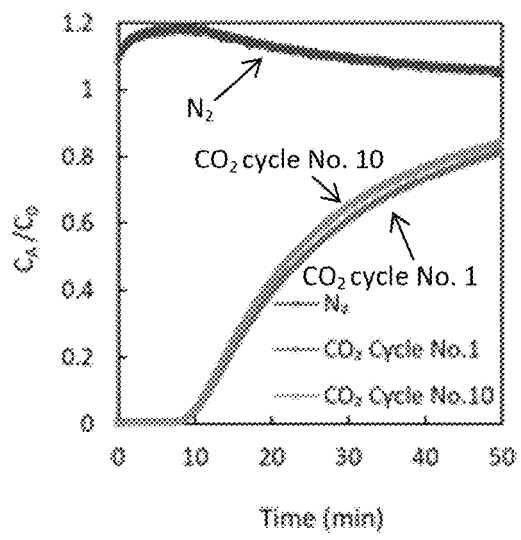
FIG. 5B is a graph showing breakthrough curves of $CO_2$ and $N_2$ after flowing a gas mixture containing $CO_2$ and $N_2$ at a 20:80 ratio through the crosslinked polymer KFUPM-2 and regenerated crosslinked polymer KFUPM-2 at $10^{th}$ cycle, respectively under wet conditions.
Figure 5C:
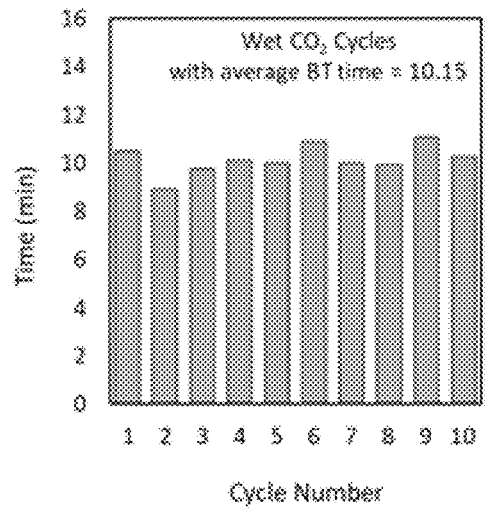
FIG. 5C is a bar graph showing the relationship of breakthrough time of $CO_2$ and number of regeneration of the crosslinked polymer KFUPM-2 under wet conditions.
Figure 6:
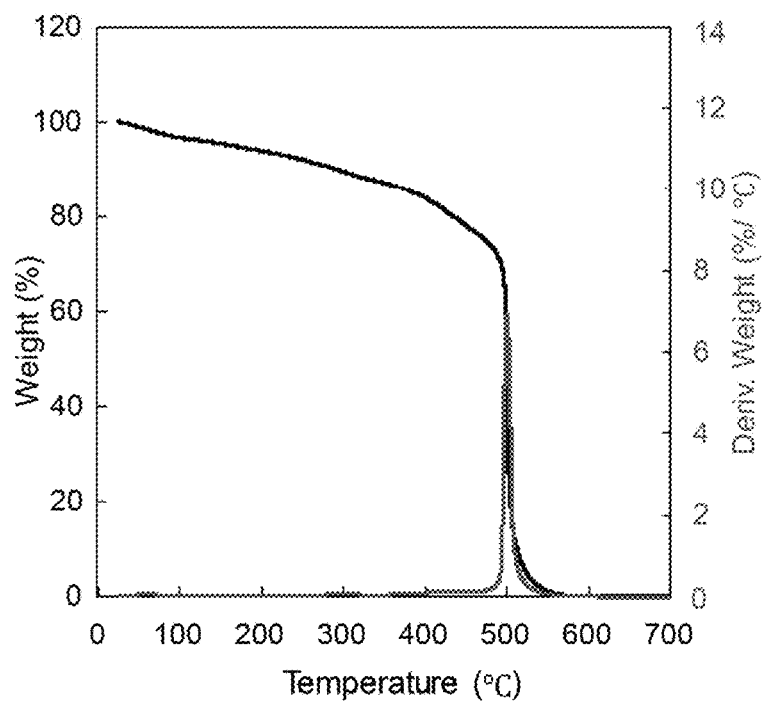
FIG. 6 is a thermal gravimetric analysis (TGA) of the crosslinked polymer KFUPM-2.
Figure 7:
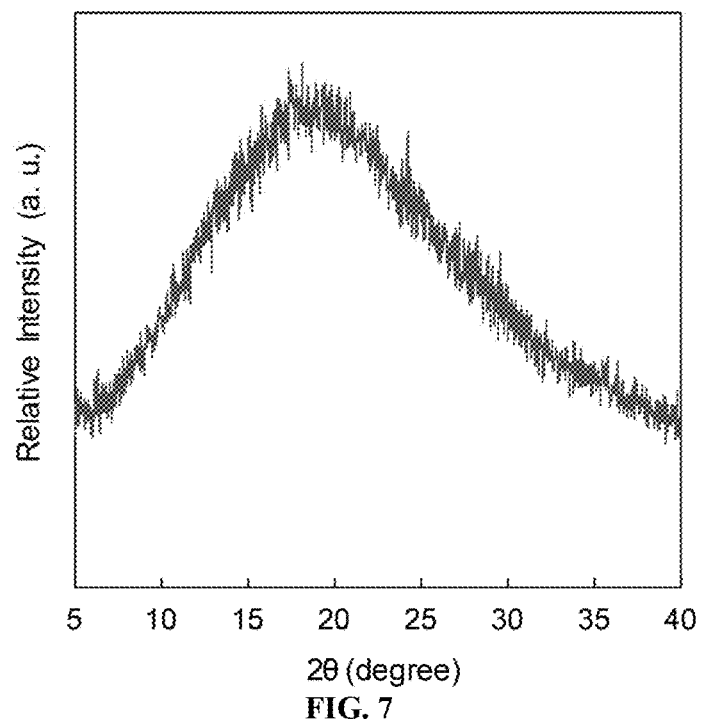
FIG. 7 is a powder X-ray diffraction pattern of the crosslinked polymer KFUPM-2.
Figure 8:
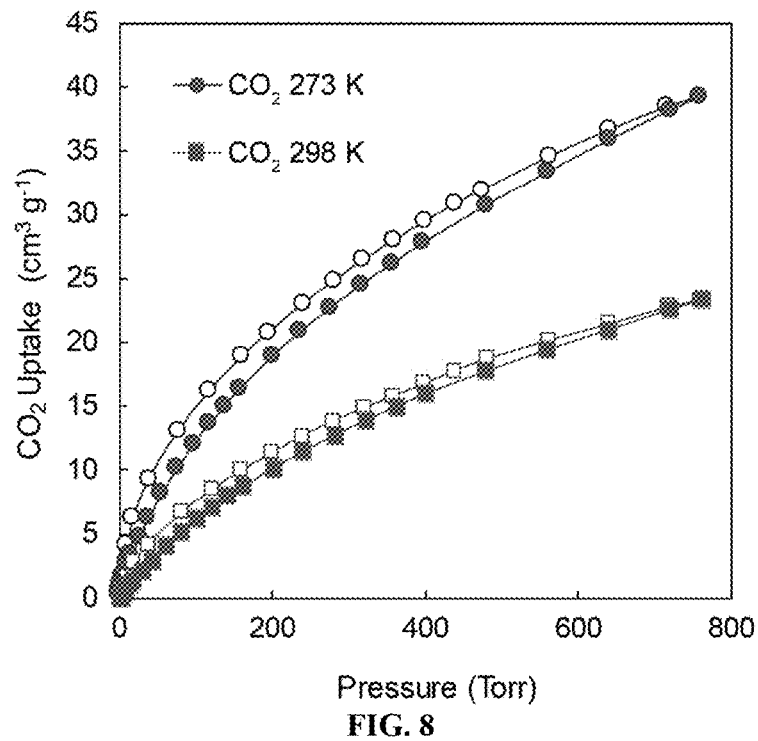
FIG. 8 is an overlay of $CO_2$ isotherms of the crosslinked polymer KFUPM-2 at temperatures of 273 K and 298 K, respectively (filled and open symbols represent adsorption and desorption branches, respectively).
Figure 9A:
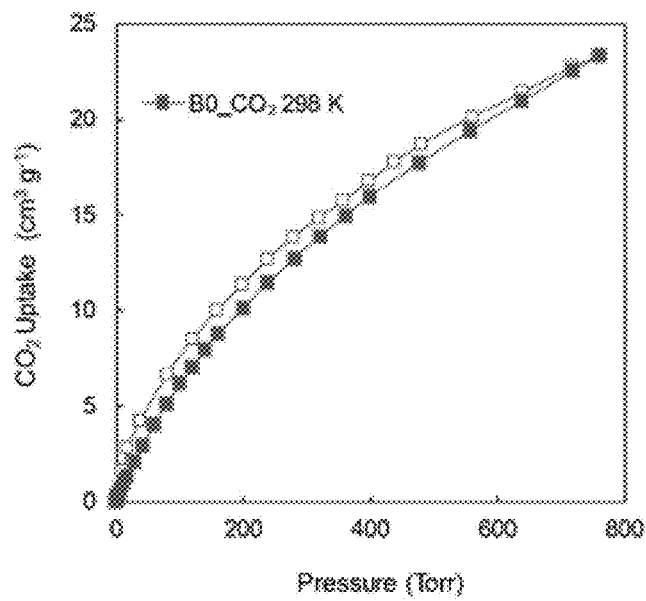
FIG. 9A is a graph showing $CO_2$ sorption isotherms of a first batch of the crosslinked polymer KFUPM-2 at 298 K (filled and open symbols represent adsorption and desorption branches, respectively).
Figure 9B:
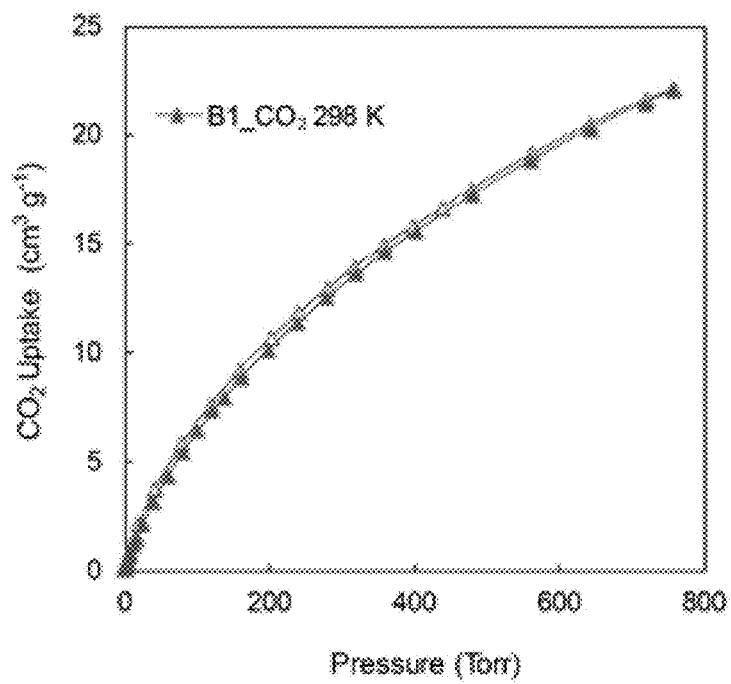
FIG. 9B is a graph showing $CO_2$ sorption isotherms of a second batch of the crosslinked polymer KFUPM-2 at 298 K (filled and open symbols represent adsorption and desorption branches, respectively).
Figure 9C:
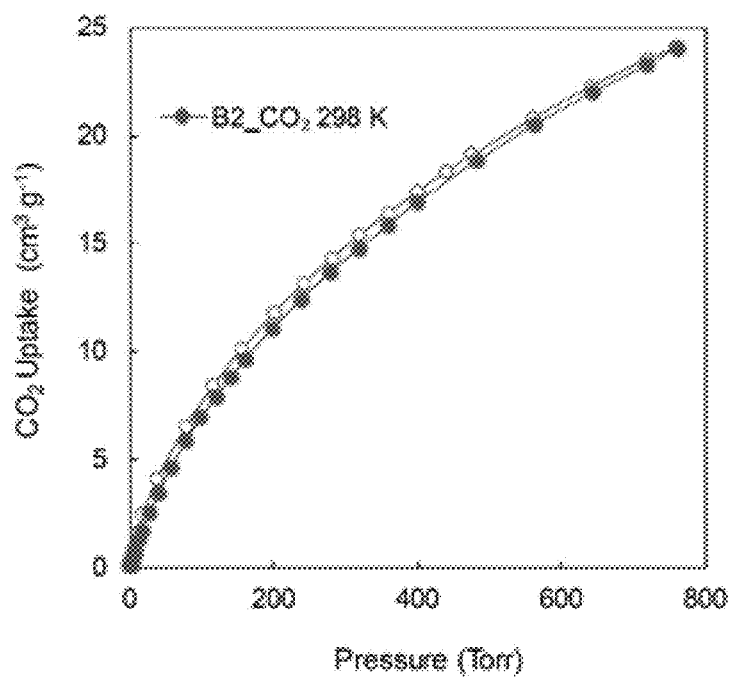
FIG. 9C is a graph showing $CO_2$ sorption isotherms of a third batch of the crosslinked polymer KFUPM-2 at 298 K (filled and open symbols represent adsorption and desorption branches, respectively).
Figure 9D:
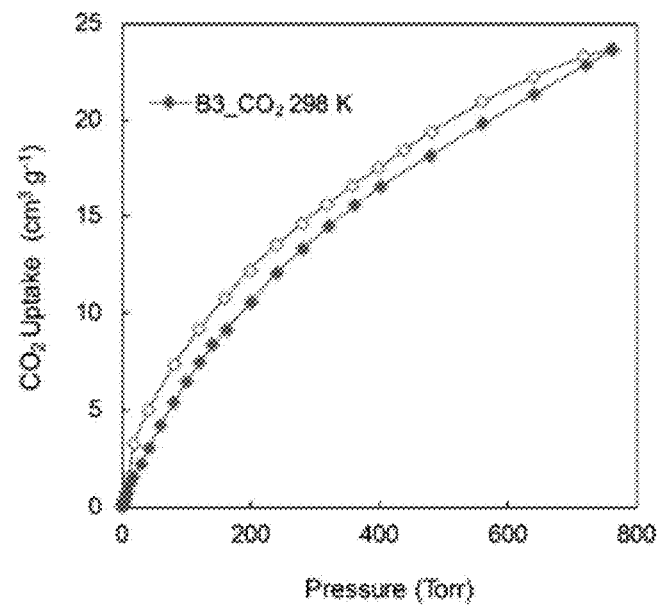
FIG. 9D is a graph showing $CO_2$ sorption isotherms of a fourth batch of the crosslinked polymer KFUPM-2 at 298 K (filled and open symbols represent adsorption and desorption branches, respectively).
Figure 10:
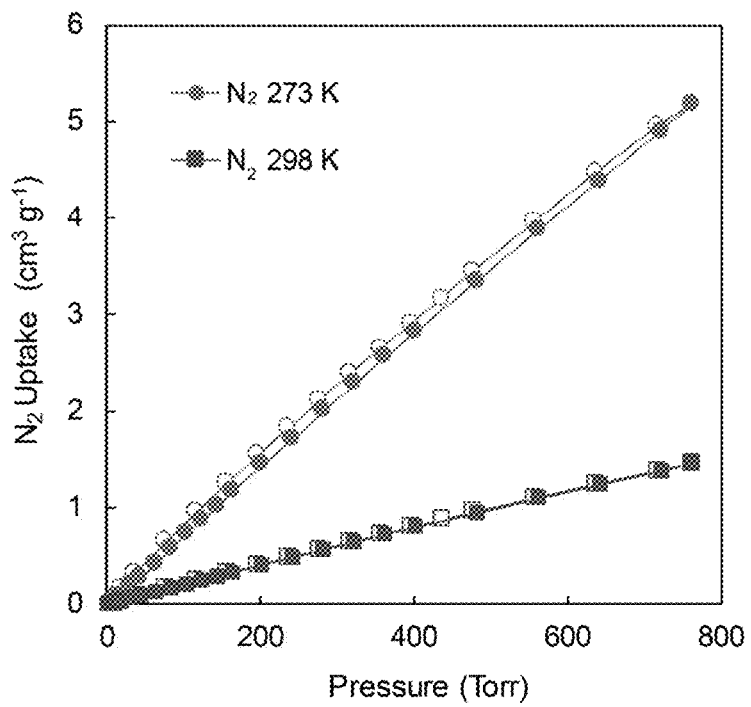
FIG. 10 is an overlay of $N_2$ isotherms of the crosslinked polymer KFUPM-2 at temperatures of 273 K and 298 K, respectively (filled and open symbols represent adsorption and desorption branches, respectively).
Figure 11:
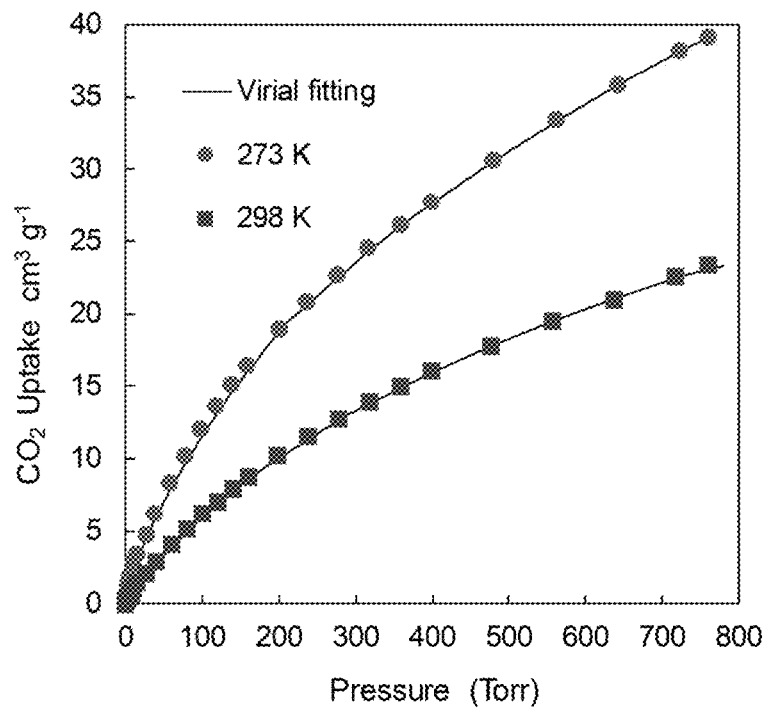
FIG. 11 is a graph showing Virial-type equation fitting of experimental $CO_2$ adsorption data of the crosslinked polymer KFUPM-2 at temperatures of 273 K and 298 K, respectively.
Figure 12:
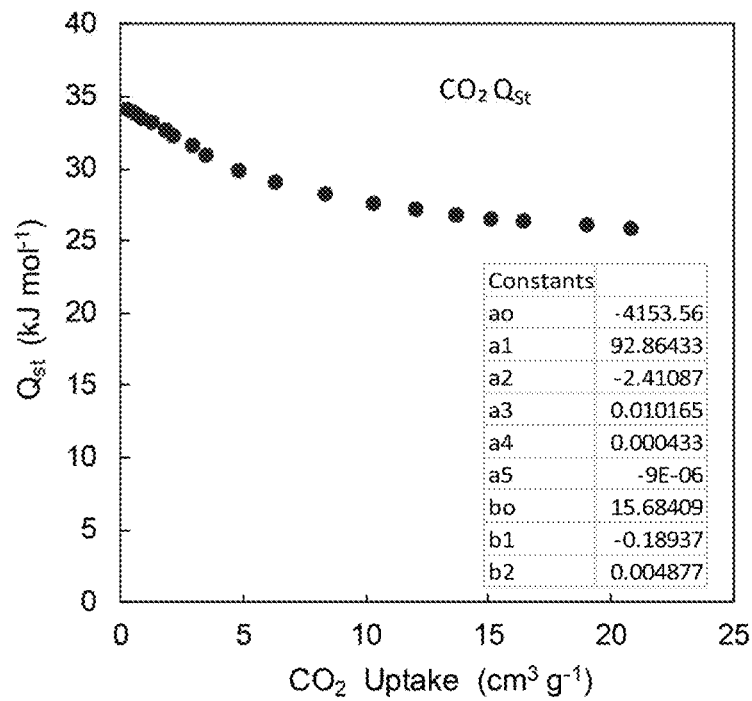
FIG. 12 is a graph showing calculated enthalpy of adsorption of the crosslinked polymer KFUPM-2 for $CO_2$ at temperatures of 273 K and 298 K, respectively.
Figure 13:
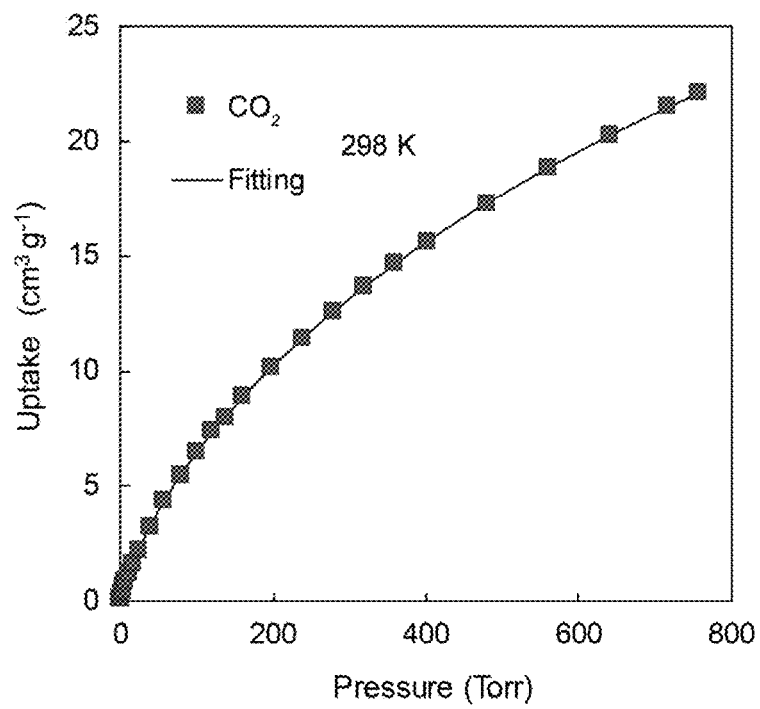
FIG. 13 is a graph showing dual site Langmuir fitting of experimental $CO_2$ adsorption data of the crosslinked polymer KFUPM-2 at 298 K.
Figure 14:
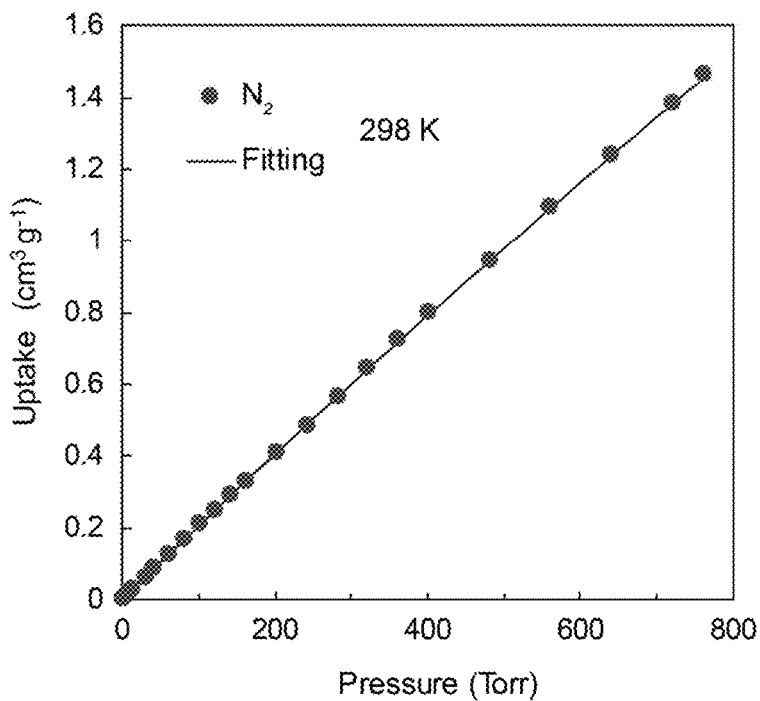
FIG. 14 is a graph showing dual site Langmuir fitting of experimental $N_2$ adsorption data of the crosslinked polymer KFUPM-2 at 298 K.
Figure 15:
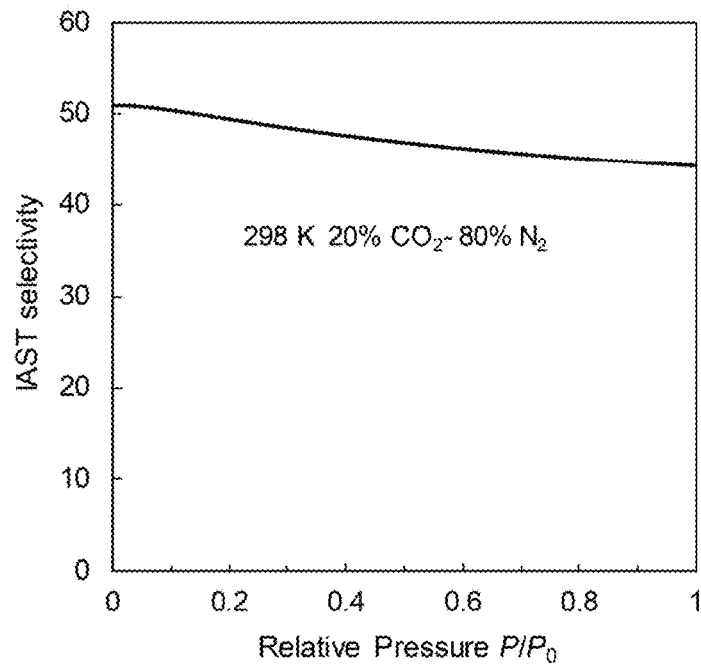
FIG. 15 is a graph illustrating the relationship between IAST $CO_2/N_2$ selectivity and relative pressure of the crosslinked polymer KFUPM-2 at 298 K.

Taking into consideration that industrial flue gas contains significant amount of moisture (5-7%) [E. J. G.; and Pennline, H. W. Photochemical Removal of Mercury from Flue Gas. *Ind. Eng. Chem. Res.* 2002, 41, 22, 5470-5476], preferable absorbent materials should demonstrate their effectiveness on mitigating the effect of water. Accordingly, the KFUPM-2 material was tested for its stability and recyclability for separating $CO_2$ in the presence of water through multicycle continuous breakthrough experiments (10 cycles) at 298 K. The KFUPM-2 material was first exposed to $N_2$ stream with 91% relative humidity (2.7 wt % as detected by the mass spectrometry) until saturation of the KFUPM-2 bed. At this point, a dry $CO_2$ stream is passed with a dual mixture ($N_2$ and $H_2O$). This process was repeated for 10 cycles through which, the material showed an excellent recycling stability with a surprising improvement in $CO_2$ uptake (almost doubled in case of full wetted sample) (FIGS. 5B and 5C). This observation indicated an increasing $CO_2$ solubility in wet conditions, which is an important aspect to consider as many porous materials exhibited a significant decrease in $CO_2$ absorption capacity in the presence of water [Liang, Z.; Marshall, M.; Chaffee, A. L. $CO_2$ Adsorption-Based Separation by Metal Organic Framework (Cu-BTC) versus Zeolite (13X). *Energy & Fuels* 2009, 23 (5), 2785-2789; Wang, Y.; Zhou, Y.; Liu, C.; Zhou, L. Comparative Studies of $CO_2$ and $CH_4$ Sorption on Activated Carbon in Presence of Water. *Colloids Surfaces A Physicochem. Eng. Asp.* 2008, 322 (1), 14-18; Liu, J.; Wang, Y.; Benin, A. I.; Jakubczak, P.; Willis, R. R.; LeVan, M. D. $CO_2/H_2O$ Adsorption Equilibrium and Rates on Metal-Organic Frameworks: HKUST-1 and Ni/DOBDC. *Langmuir* 2010, 26 (17), 14301-14307; F. B.; Ruthven, D. M. The Effect of Water on the Adsorption of CO2 and C3H8 on Type X Zeolites. *Ind. Eng. Chem. Res.* 2004, 43, 26, 8339-8344; and Kizzie, A. C.; Wong-Foy, A. G.; Matzger, A. J. Effect of Humidity on the Performance of Microporous Coordination Polymers as Adsorbents for $CO_2$ Capture. *Langmuir* 2011, 27 (10), 6368-6373] while few examples retained their uptake in wet conditions [Hao, G.-P.; Li, W.-C.; Qian, D.; Wang, G.-H.; Zhang, W.-P.; Zhang, T.; Wang, A.-Q.; Schtith, F.; Bongard, H.-J.; Lu, A.-H. Structurally Designed Synthesis of Mechanically Stable Poly(benzoxazine-Co-Resol)-Based Porous Carbon Monoliths and Their Application as High-Performance $CO_2$ Capture Sorbents. *J. Am. Chem. Soc.* 2011, 133 (29), 11378-11388; and Li, D.; Furukawa, H.; Deng, H.; Liu, C.; Yaghi, O. M.; Eisenberg, D. S. Designed Amyloid Fibers as Materials for Selective Carbon Dioxide Capture. *Proc. Natl. Acad. Sci. U.S.A.* 2014, 111 (1), 191-196]. The KFUPM-2 material was regenerated under mild conditions by a humid $N_2$ flow at ambient temperature. This regeneration process reflects the capability of the KFUPM-2 material for a pressure swing adsorption (PSA) which is used for industrial scale flue gas as an energy efficient process.

Example 13

Varying the ratios of different monomers (with different geometry), the surface area and pores size of the resulting copolymer could be fine-tuned. Following this strategy, a new crosslinked porous polymer termed KFUPM-2 was synthesized from a one-pot in situ polycondensation of phenothiazine (wide monomer) and pyrrole (short) monomer at 1:3 ratio using p-formaldehyde as a crosslinker in the presence of a catalytic amount of $FeCl_3$. The replacement of benzene-1,4-diamine used in KFUPM-1 with phenothiazine led to superior dynamic capacity of KFUPM-2 under wet conditions.

The KFUPM-2 polymer was proven microporous with a good surface area (352 $m^2\ g^{-1}$) and had a majority of micropores (1.0 nm pore width). The KFUPM-2 showed moderate $CO_2$ uptake of 23.3 $cm^3\ g^{-1}$ with a $CO_2/N_2$ selectivity of 64 at 298 K. Furthermore, the KFUPM-2 material was explored for the selective dynamic $CO_2$ separation from dry and wet (91% humidity) $N_2$ flow showing a dynamic capacity of 9.7 and 35 $cm^3\ g^{-1}$ for dry and wet conditions, respectively. Additionally, multicycle continues breakthrough experiments (10 cycles) were performed and the regeneration between each cycle was achieved at ambient condition by a simple $N_2$ flow. Such high recyclability and energy efficient regeneration make KFUPM-2 a promising candidate for selective $CO_2$ capture and separation under humidity commonly found in industrial flue gas.

The invention claimed is:

1. A crosslinked polymer, comprising reacted units of:

a phenothiazine monomer of formula (I)

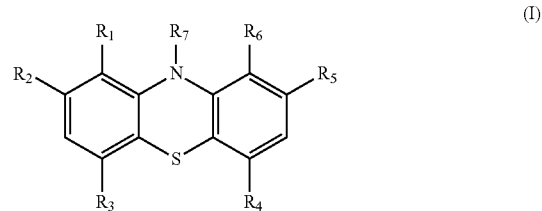

or a salt thereof, a solvate thereof, a tautomer thereof a stereoisomer thereof, or a mixture thereof;

a pyrrole monomer of formula (II)

or a salt thereof, a solvate thereof, a tautomer thereof a stereoisomer thereof, or a mixture thereof; and an aldehyde of formula (III)

(III)

or a salt thereof, a solvate thereof, a stereoisomer thereof, or a mixture thereof,
wherein:
$R_1$, $R_2$, $R_3$, $R_4$, $R_5$, and $R_6$ are independently selected from the group consisting of a hydrogen, an optionally substituted alkyl, an optionally substituted cycloalkyl, an optionally substituted arylalkyl, an optionally substituted aryl, an optionally substituted alkoxy, and an optionally substituted alkylthio;
$R_7$ is selected from the group consisting of a hydrogen, an optionally substituted alkyl, an optionally substituted cycloalkyl, and an optionally substituted arylalkyl;
$R_8$ is selected from the group consisting of a hydrogen, an optionally substituted alkyl, an optionally substituted cycloalkyl, an optionally substituted arylalkyl, and an optionally substituted aryl; and
$R_9$ is selected from the group consisting of a hydrogen, an optionally substituted alkyl, an optionally substituted cycloalkyl, an optionally substituted arylalkyl, and an optionally substituted aryl.

2. The crosslinked polymer of claim 1, wherein $R_7$ is a hydrogen.

3. The crosslinked polymer of claim 1, wherein the phenothiazine monomer of formula (I) is

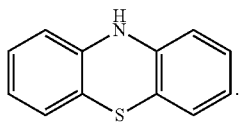 [SMILES: c1ccc2c(c1)Nc1ccccc1S2]

4. The crosslinked polymer of claim 1, wherein the pyrrole monomer of formula (II) is

5. The crosslinked polymer of claim 1, wherein the aldehyde of formula (III) is formaldehyde.

6. The crosslinked polymer of claim 1, wherein a molar ratio of the pyrrole monomer of formula (II) to the phenothiazine monomer of formula (I) is in a range of 1:1 to 6:1.

7. The crosslinked polymer of claim 1, wherein a molar ratio of the aldehyde of formula (III) to the phenothiazine monomer of formula (I) is in a range of 3:1 to 12:1.

8. The crosslinked polymer of claim 1, wherein a molar ratio of the pyrrole monomer of formula (II) to the phenothiazine monomer of formula (I) is in a range of 2.5:1 to 3.5:1, and wherein a molar ratio of the aldehyde of formula (III) to the phenothiazine monomer of formula (I) is in a range of 5:1 to 7:1.

9. The crosslinked polymer of claim 1, which has a BET surface area in the range of 300-600 $m^2/g$.

10. The crosslinked polymer of claim 1, which is porous with an average pore width of 0.8-2 nm.

11. The crosslinked polymer of claim 1, which has a $CO_2$ uptake capacity in a range of 15-45 $cm^3/g$ at a temperature of 0-40° C. and a pressure of 400-800 Torr.

12. The crosslinked polymer of claim 1, which has an ideal selectivity of $CO_2$ over $N_2$ in a range of 10-60.

13. A method of making the crosslinked polymer of claim 1, the method comprising:
mixing the phenothiazine monomer of formula (I) and the aldehyde of formula (III) in a solution comprising a solvent to form a first mixture;
mixing the pyrrole monomer of formula (II) and an acid with the first mixture to form a second mixture; and
heating the second mixture thereby forming the crosslinked polymer.

14. The method of claim 13, wherein the acid is ferric chloride.

15. The method of claim 13, wherein the solvent comprises dimethylformamide.

16. The method of claim 13, wherein the second mixture is heated at a temperature of 70-150° C.

17. A method of separating a first gas from a fluid mixture comprising the first gas and a second gas, the method comprising:
contacting the fluid mixture with the crosslinked polymer of claim 1; and
adsorbing the first gas onto the crosslinked polymer thereby separating the first gas from the fluid mixture and forming a first gas loaded crosslinked polymer.

18. The method of claim 17, wherein the first gas is $CO_2$, and wherein the second gas is $N_2$.

19. The method of claim 17, wherein the fluid mixture further comprises $H_2O$.

20. The method of claim 18, further comprising:
desorbing the first gas from the first gas loaded crosslinked polymer by flowing $N_2$ gas over the first gas loaded crosslinked polymer to regenerate the crosslinked polymer; and
reusing the crosslinked polymer.

* * * * *